(12) United States Patent
Marcilese et al.

(10) Patent No.: US 7,789,012 B2
(45) Date of Patent: Sep. 7, 2010

(54) VALVE BONNET ASSEMBLY

(75) Inventors: Joseph Peter Marcilese, Chatsworth, CA (US); Dean C. Richards, Chatsworth, CA (US); Michael C. Gagne, Chatsworth, CA (US)

(73) Assignee: Aquasyn, LLC, Incline Village, NV (US)

( * ) Notice: Subject to any disclaimer, the term of this patent is extended or adjusted under 35 U.S.C. 154(b) by 0 days.

(21) Appl. No.: 12/284,788

(22) Filed: Sep. 24, 2008

(65) Prior Publication Data
US 2009/0072172 A1   Mar. 19, 2009

Related U.S. Application Data

(63) Continuation-in-part of application No. 11/113,474, filed on Apr. 25, 2005, now abandoned.

(51) Int. Cl.
*F16K 31/126* (2006.01)
(52) U.S. Cl. ............................. 92/87; 137/240; 251/331
(58) Field of Classification Search ................ 251/331, 251/335.2; 137/240; 92/87
See application file for complete search history.

(56) References Cited

U.S. PATENT DOCUMENTS

| | | | | | |
|---|---|---|---|---|---|
| 4,325,401 | A | * | 4/1982 | Ukai et al. | 137/240 |
| 4,570,665 | A | * | 2/1986 | Zimmerly | 137/240 |
| 4,836,236 | A | * | 6/1989 | Ladisch | 137/241 |
| 5,465,748 | A | * | 11/1995 | Bowers | 137/240 |
| 6,923,198 | B2 | * | 8/2005 | McKenzie et al. | 251/331 |

* cited by examiner

*Primary Examiner*—John Bastianelli
(74) *Attorney, Agent, or Firm*—Maria Erlinda Co Sarno

(57) ABSTRACT

An improved bonnet assembly for a weir type or radial style valve, comprising a hollow bonnet housing an actuator assembly comprising an actuator connected to a spindle, the hollow bonnet having a plurality of orifices to allow free entry and exit of a liquid such as a cleaning solution within the bonnet and to enable the liquid to thoroughly contact and exit the bonnet assembly without the need of disassembly. The valve or parts of the valve such as the bonnet assembly or its components are made of performance engineered polymeric material to prevent corrosion and/or galling, and also reduce the weight and sometimes the cost of the valve without sacrificing quality and performance.

19 Claims, 21 Drawing Sheets

VALVE BONNET ASSEMBLY

This is a continuation-in-part application of Ser. No. 11/113,474 filed Apr. 25, 2005 now abandoned which is hereby incorporated by reference.

This invention relates to a sanitary, hygienic bonnet assembly for a valve suitable for use in the pharmaceutical, chemical, biotechnology, nanotechnology, food, beverage, semiconductor and similar industries.

BACKGROUND

A bonnet is one of the major components of certain types of valves. A valve is a device for controlling the flow or pressure of fluids such as liquids, gases, and slurries in a pipe or other enclosures. Control of flow uses a movable element that opens, shuts, or partially obstructs an opening in a passageway. There are a variety of valves in use, their classification is based on function, flow medium, mechanical design, method of operation, and motion of the parts within the valve relative to the valve seat and the manner in which the motion of the parts within the valve is produced. This invention applies to weir and radial style diaphragm valves because these are commonly used when sanitary, hygienic and sterile conditions are desired because the mechanism and the flow path are simple in construction and the working mechanical parts of the valve are isolated inside the bonnet, separated from the fluid flowing through the valve body of the valve. Weir diaphragm valve is also referred to here simply as weir valve and the radial style diaphragm valve is also referred to here simply as radial style valve. Hygienic has replaced the old nomenclature of sanitary in the industry but is being retained here for those in the art that are still using the term sanitary to mean hygienic. Hygienic is defined by BPE (Bio Process Equipment standard of the American Society of Mechanical Engineers) as pertaining to equipment and piping system that by design, material of construction and operation provide for the maintenance of cleanliness so that products produced by these systems will not adversely affect human or animal health. Other types of valve which are constructed differently from the weir or radial style valve described herein may not be able to apply the teachings of the claimed invention to maintain the valve in a hygienic condition. In a weir or radial style valve, a diaphragm, placed between the bonnet and valve body, separates the bonnet from the valve body. The process fluid or product flows through the passageway in the valve body and does not enter the bonnet. An actuator connected to a stem or spindle which is in communication with a handle for controlling the amount of pressure applied to the diaphragm is inside the bonnet compartment which is hollow. The diaphragm in the weir and radial style valves which is usually made of a flexible material is the movable element that opens, shuts, or partially obstructs an opening in a passageway where the fluid flows. The diaphragm is the part that gets in direct contact with the fluids. The actuator is the part that pushes the diaphragm against a weir on a weir valve or against an opening of the passageway on a radial style valve to partially close, close or stop the fluid flow. Fluid is allowed to flow when the diaphragm is not pressing fully on the weir or closing the fluid path. The actuator is also referred to in the field as the compressor. Herein, the actuator, spindle or stem, and the bonnet are collectively referred to as the bonnet assembly and the actuator connected to a spindle is referred to as actuator assembly which is also sometimes referred to as compressor device. The actuator assembly as stated above is situated within the bonnet which is a hollow housing. The components or parts of the components of the actuator responsible for the operation of the valve are housed inside the bonnet. Although it is only the diaphragm that gets direct contact with the fluid, for hygienic products regulated by agencies like the Food and Drug Administration, it is a common practice to clean the entire valve to prevent microbial build-up. There are no set cleaning schedules. This can be done after every usage or periodically at a given interval, mostly dictated by good manufacturing practices and the like. Most manufacturers, especially those that produce sanitary, hygienic or sterile products, have their own validated cleaning procedure. These valves are presently cleaned by dismantling the individual components of each part of the valve, the bonnet assembly further disassembled into its components, and subjecting these to a cleaning procedure. The cleaning procedure applied here is by submersion. Present valves and bonnet assemblies cleaned by submersion into the cleaning solution do not thoroughly clean the entire valve or the bonnet assembly. Dismantling is needed. Submersion also ruins the valve and its bonnet assembly because some or all parts of the present valves or bonnet assemblies are made of materials that are usually adversely affected by the cleaning solution. To prevent this, the cleaning process requires quite a bit of cleaning and rinsing solutions and is still without guaranty of being thoroughly cleaned because the present valves or bonnet assemblies are not properly designed to allow the cleaning solution to freely flow into, around the parts of the valve or the bonnet assembly, and exit out of the device while the valve or bonnet is submerged into the cleaning solution and in the subsequent rinsing solutions. Inadequate cleaning results when the cleaning solution is not free to flow in and out of the valve because some parts in the interior of the bonnet are not readily accessible, consequently, residual products or cleaning solutions still remain inside the bonnet compartment. Herein, cleaning solutions include other liquids such as the rinsing solutions even if it is not specifically stated. Looking at the main parts of a valve, cleaning the bonnet assembly would be the most tedious and time consuming. It is therefore desirable to design a bonnet assembly or an entire valve that can be cleaned by simply submerging the bonnet assembly or the entire valve into the cleaning solution without disassembly into its components or into parts of each components. Modification of the bonnet as described herein has allowed thorough cleaning of the whole weir diaphragm valve or the radial style diaphragm valve by submersion without dismantling the bonnet from the valve body or dismantling the bonnet into its parts.

The parts of the present valve that are not made of stainless steel, for example, the actuator and more specifically the spindle, is usually made of brass or bronze. With repeated usage, corrosion occurs on the spindle, particularly those that are threaded, due to the frictional rubbing between the spindle and the part of the actuator in direct communication or connected to the spindle, coupled with the chemical/s in the cleaning solution reacting with the brass and/or bronze material. Galling can also occur on assemblies that are manufactured entirely with stainless steel. Galling and corrosion combine to cause seizure especially on any threading mechanism employed in the valve thereby making the valve non-functional. Some valve manufacturers have substituted the brass and bronze material with stainless steel to prevent corrosion. This delays the process but does not solve the problem. The use of stainless steel for the spindle, with or without threading, requires a lubricant. This lubricant may not be compatible with the fluid being processed and in such situation may in itself be a contaminant. Further, the lubricant wears out with time. Also, the cleaning solution may react with the lubricant to cause its breakdown or crystallization which hastens the galling process.

It is therefore an object of this invention to provide a weir valve or a radial style valve having a bonnet assembly that will allow the whole valve to be thoroughly cleaned by submersion into a cleaning solution without dismantling the valve into its parts.

It is also an object of this invention to provide a method on how the bonnet can be redesigned on the various types of weir valve and radial style valves to allow cleaning without disassembly.

It is a further object of this invention to provide a spindle or stem and/or bonnet assembly or a valve as a whole made of a material that is not susceptible to galling and/or corrosion.

SUMMARY OF THE INVENTION

This invention relates to a sanitary hygienic weir type diaphragm valve and a sanitary hygienic radial style diaphragm valve that can be cleaned by submersion without disassembly due to an improved sanitary, hygienic bonnet assembly. A weir type valve has a valve body having a weir transposed intermediate and transversely of an inlet and an outlet port of a passageway where the fluid flows. A radial style valve has a valve body having a valve seat instead of a weir where a diaphragm situates to control the flow of the fluid through a fluid passageway. The improved hygienic bonnet is hollow and has at least three spaced apart orifices located at a junction of the bottom peripheral end of the bonnet and the flanged base extending from the bottom peripheral end. The orifices are of a size and shape allowing free entry and exit of a liquid introduced into the bonnet thereby allowing the liquid to thoroughly contact and exit the bonnet assembly. The location, size, shape and number of orifices at the improved bonnet are critical factors that enable a thorough cleaning of the valve by submersion into a cleaning solution without the need of disassembly. The hollow bonnet also fully houses the actuator assembly, an actuator connected to a spindle, which moves up and down through a top opening at the top surface of the bonnet. A handle connected to the spindle of the actuator assembly causes the upwards and downwards motion of the spindle in and out of the bonnet and together with the actuator, controls the amount of pressure applied to the diaphragm situated between the bonnet and the valve body. For spindles having threads engaging a matching surface on the actuator, the handle cause the threads of the spindle to engage upwards and downwards along the matching surface of the actuator as the handle moves the actuator assembly up and down. The diaphragm controls the flow of the fluid through the passageway. The flow is stopped when the diaphragm presses on the weir or on the valve seat. The bonnet assembly connects to the rest of the components of the valve by connectors known in the art such as fasteners, clamps and retaining nuts or ring. The orifices may be of different geometric shapes and designs formed by casting, boring or other known means of the art. They may be formed by leaving parts of a bottom end of the hollow bonnet adjoining with the flanged base of the hollow bonnet, by originating from a bottom end of the bonnet and extending through a portion of the flanged base, or by confining the orifices at the bottom end of the bonnet just above the flanged base. The number and size of the orifices are dependent upon the surface area of the bonnet and the structural strength of the bonnet required to house the actuator assembly. Circular orifices of at least 3/16 of an inch in diameter was found to function adequately. Because a valve is exposed to different liquids not just the cleaning solutions and the different types of fluids being processed using a valve, it is recommended to manufacture the valve as a whole or the components of the valve such as the bonnet assembly as a whole, or only the actuator assembly within the bonnet assembly, or only the spindle within the actuator assembly of the bonnet assembly or only the threaded components within the valve, with a corrosion and galling resistant material. A suitable corrosion and galling resistant material is a performance engineered polymeric material. These materials are especially ideal for parts within the valve or the bonnet assembly that are subjected to constant rubbing of the part against another part of the valve such as the spindle. Typical examples of this performance engineered polymeric material include acrylonitrile butadiene styrene (ABS), fluoropolymers, polyamides (Pas-Nylon), polyarylates (PAryls), polycarbonate (PC), thermoplastic polyesters (PET, PBT), thermoplastic polyimides (PI, PAI, PEI), polyoxymethylene (POM Acetal), polyphenylene oxide (PPO), polyaryletherketones (PEEK, PEK), polysulphones (Psul, PES), polyphenylene sulphide (PPS), liquid crystal polymers (LCPs), fluorinated ethylene propylene (FEP), perfluoroalkoxy (PFA), and polyvinylidene fluoride (PVDF) and some amorphous and semi-crystalline thermoplastics. The substitution of the performance engineered plastic or polymeric material for the metals also lightens the weight of the valve and may also cut the cost of the valve without sacrificing quality and performance.

Other embodiments of the present invention will become readily apparent to those skilled in the art from the following detailed description, wherein it shows and describes only certain embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWING

Aspects of the present invention are illustrated by way of example, and not by way of limitation, in the accompanying drawings, wherein.

DETAILED DESCRIPTION OF THE INVENTION

The detailed description represented herein is not intended to represent the only way or the only embodiment in which the claimed invention may be practiced. The description herein is provided merely as an example or examples or illustrations of the claimed invention and should not be construed as the only way or as preferred or advantageous over other embodiments or means of practicing the invention. Any means of providing a plurality of orifices or openings at a bottom section of a bonnet that allows the free entrance and exit of liquids within the bonnet housing to enable a thorough cleaning of the valve by submersion coupled with the substitution of the metal material on the valve or any or all of the following: metal spindle or other threaded parts of the valve, the actuator or compressor, or the bonnet, with a suitable high temperature resistant engineered plastic or polymeric material, also referred to as performance engineered plastic or polymeric material, to prevent galling and corrosion is within the scope of this invention. The detailed description includes specific details to provide a thorough understanding of the claimed invention and it is apparent to those skilled in the art that the claimed invention may be practiced without these specific details.

Figure 1:
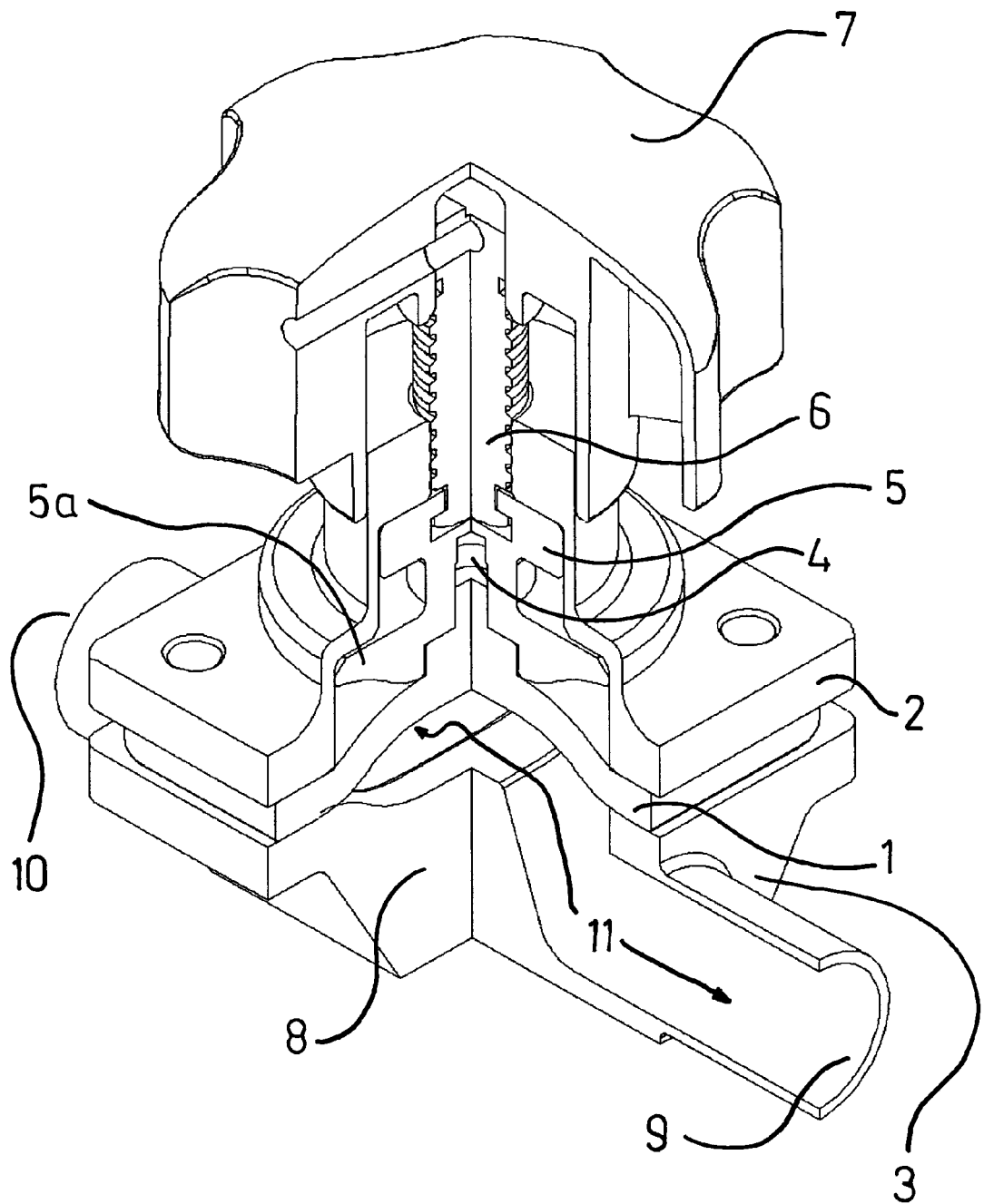
FIG. 1 is a conventional weir type diaphragm valve having a cut out portion showing the interior of the valve.
Figure 2:
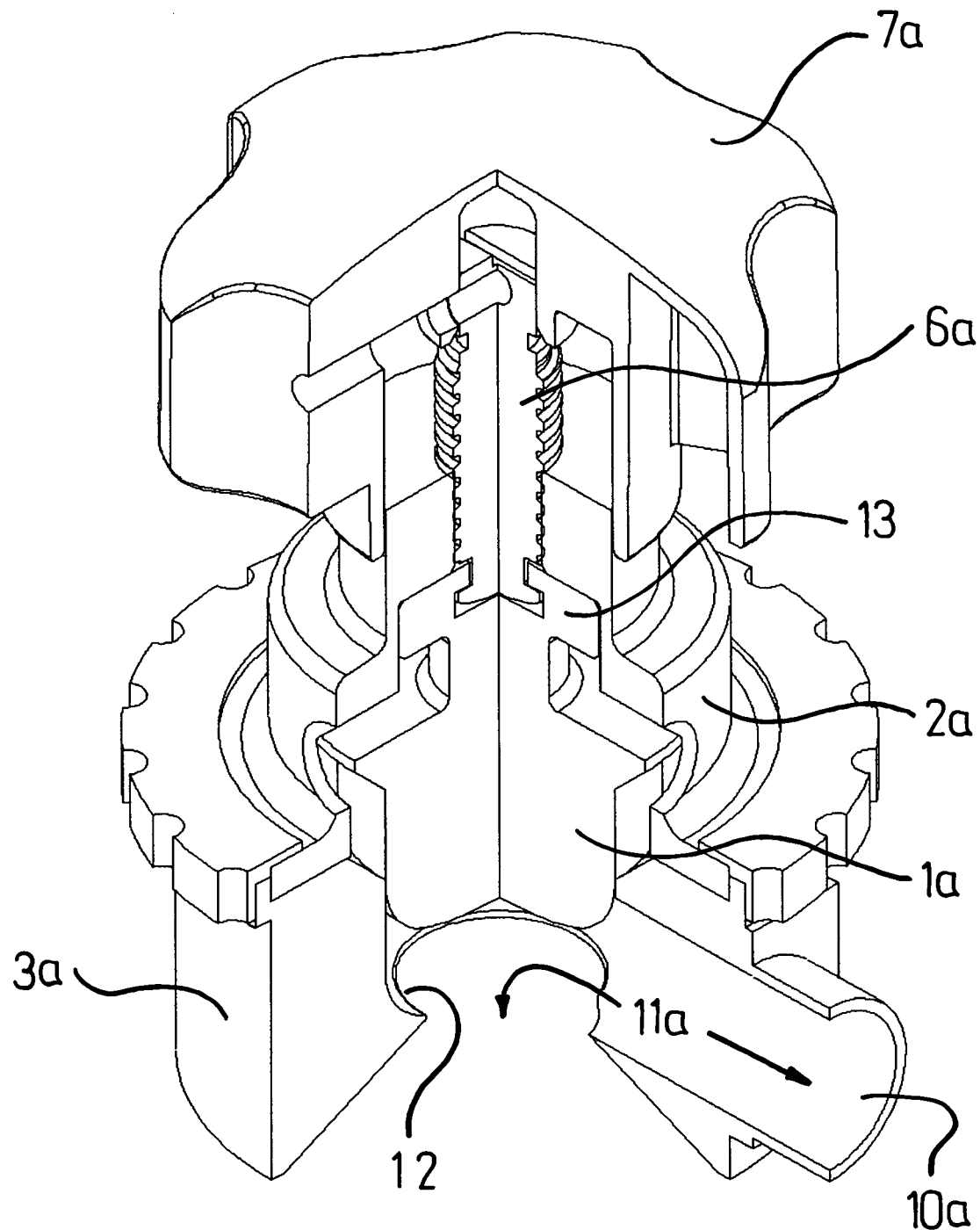
FIG. 2 is a conventional radial style diaphragm valve having a cut out portion showing the interior of the valve.

The improved cleanable bonnet assembly 100 of this invention is adoptable to a weir type diaphragm valve and a radial style diaphragm valve shown in FIGS. 1 and 2. The weir type valve differs from a radial style valve mainly on the design of the fluid path or passageway. A brief description of the valves are given to assist in understanding the invention. The illustrations herein shows the major parts of the weir type and radial style valves.

Figure 3:
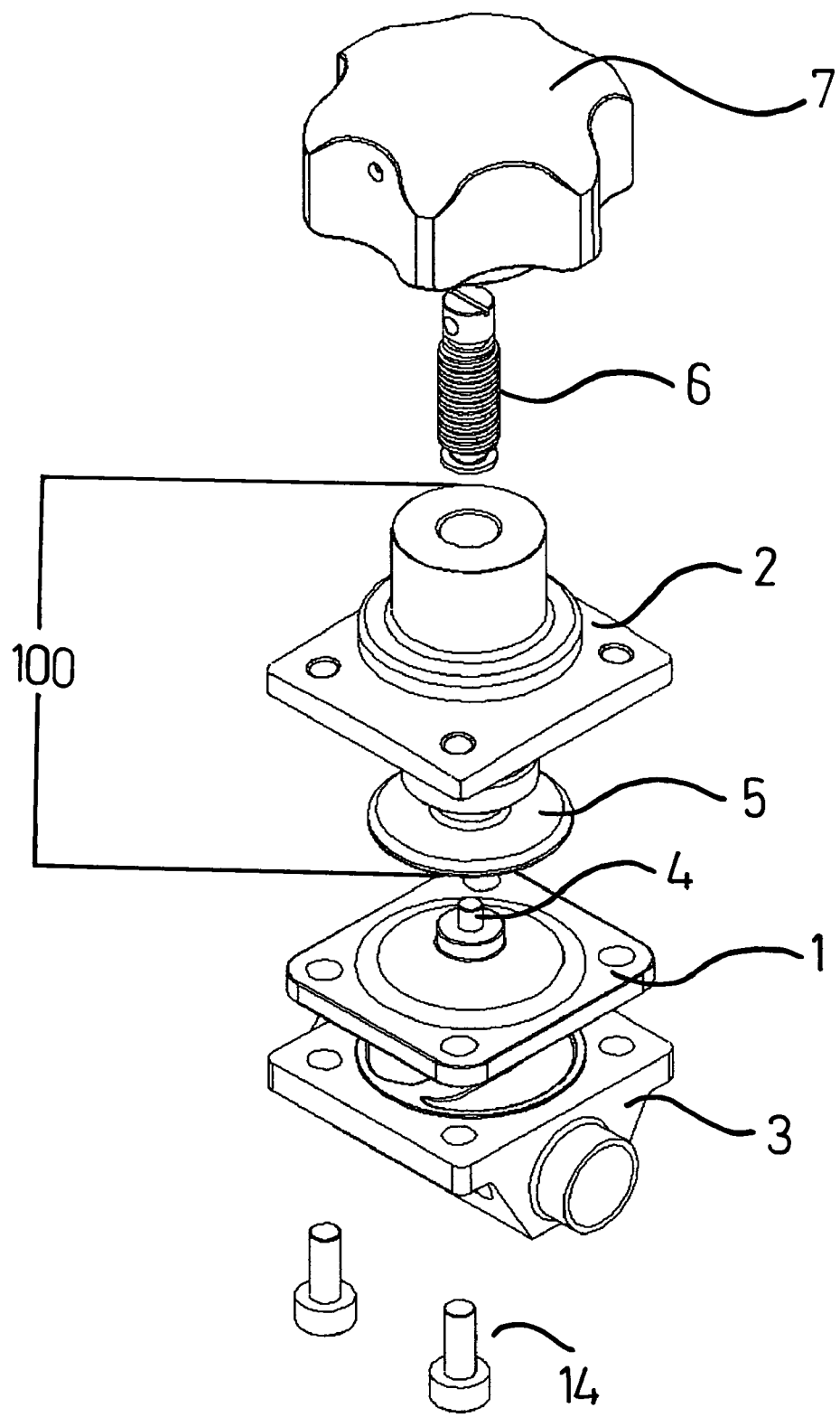
FIG. 3 is an exploded view of the major parts of a prior art weir type diaphragm valve.

A typical weir type diaphragm valve as shown in FIG. 1, comprises a diaphragm 1 situated between a bonnet 2 and a valve body 3. The diaphragm 1 is connected to one side of the bonnet 2 by a connector 4 which is in turn connected to an actuator 5 generally comprising a compressor 5a with one end connected to the diaphragm 1 through the connector 4 and the other end connected to a stem or spindle 6 whose up and down motion caused by the turning of a handle 7 connected to the spindle 6 controls the position of the diaphragm 1 in relation to the weir 8 of the diaphragm valve. The weir 8 is disposed intermediate and transversely of an inlet 9 and an outlet 10 port of a passageway 11 of the valve body 3 wherein the fluid flows. The passageway 11 is sometimes, as illustrated here, a chamber created when the bonnet, diaphragm and valve body are fastened together. The connector 4 is the molded head of and integral to the diaphragm 1 fitting a slot or other connecting means in the compressor 5a. The connector 4 can also be a screw that is molded into the diaphragm and threads into the compressor 5a. FIG. 3 shows how the parts are assembled together using a fastener 14. Different types of fasteners can be used and are known in the art.

Figure 3A:
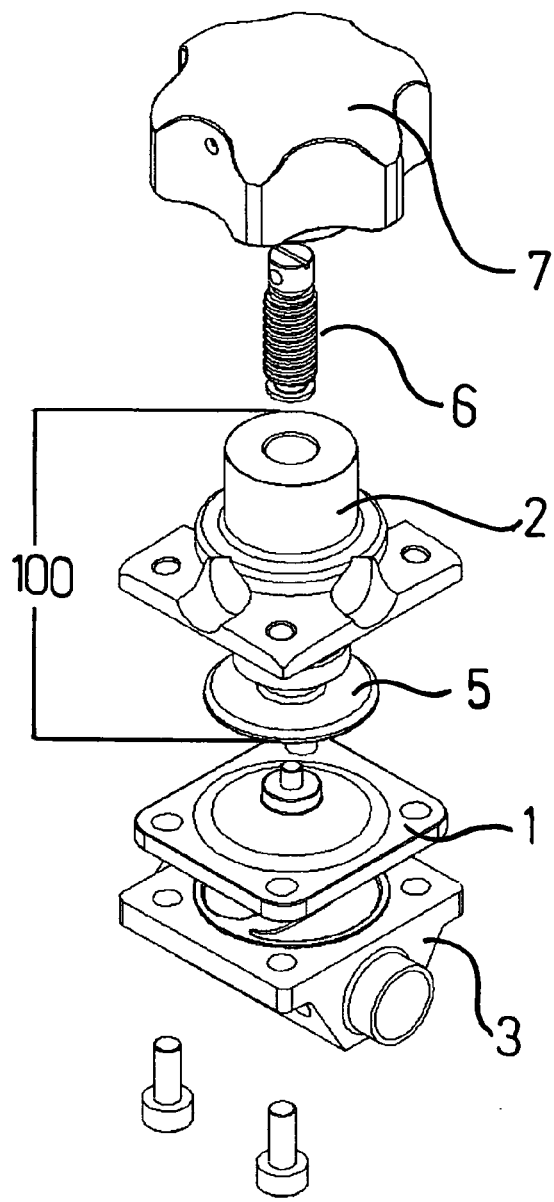
FIG. 3A is an exploded view of the major parts of the claimed weir type diaphragm valve.
Figure 3C:
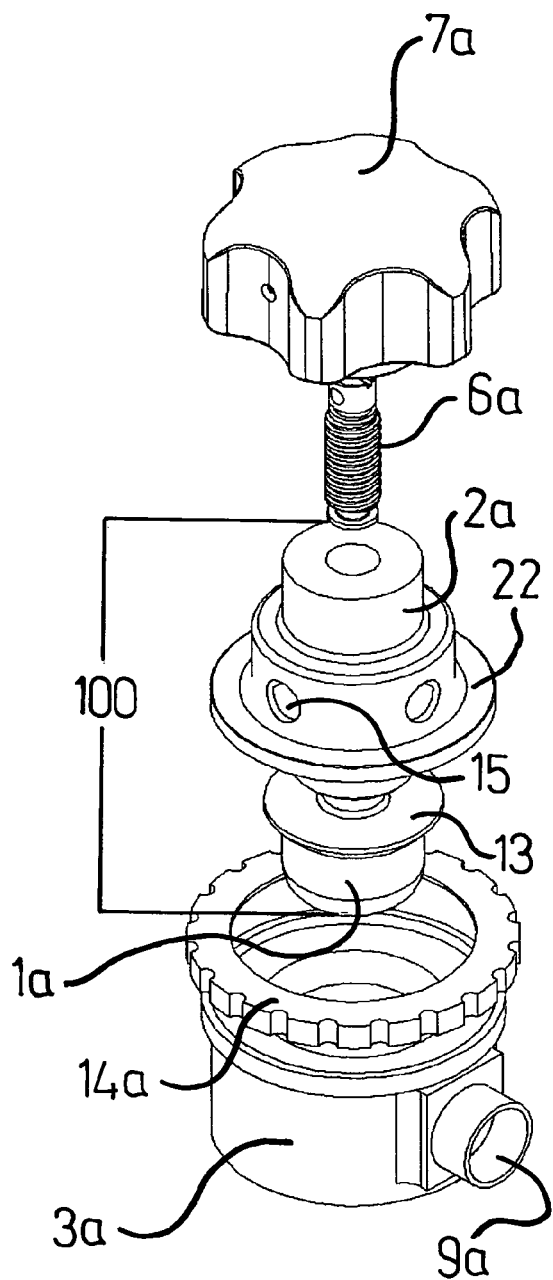
FIG. 3C is an exploded view of the major parts of the claimed radial style diaphragm valve.
Figure 3B:
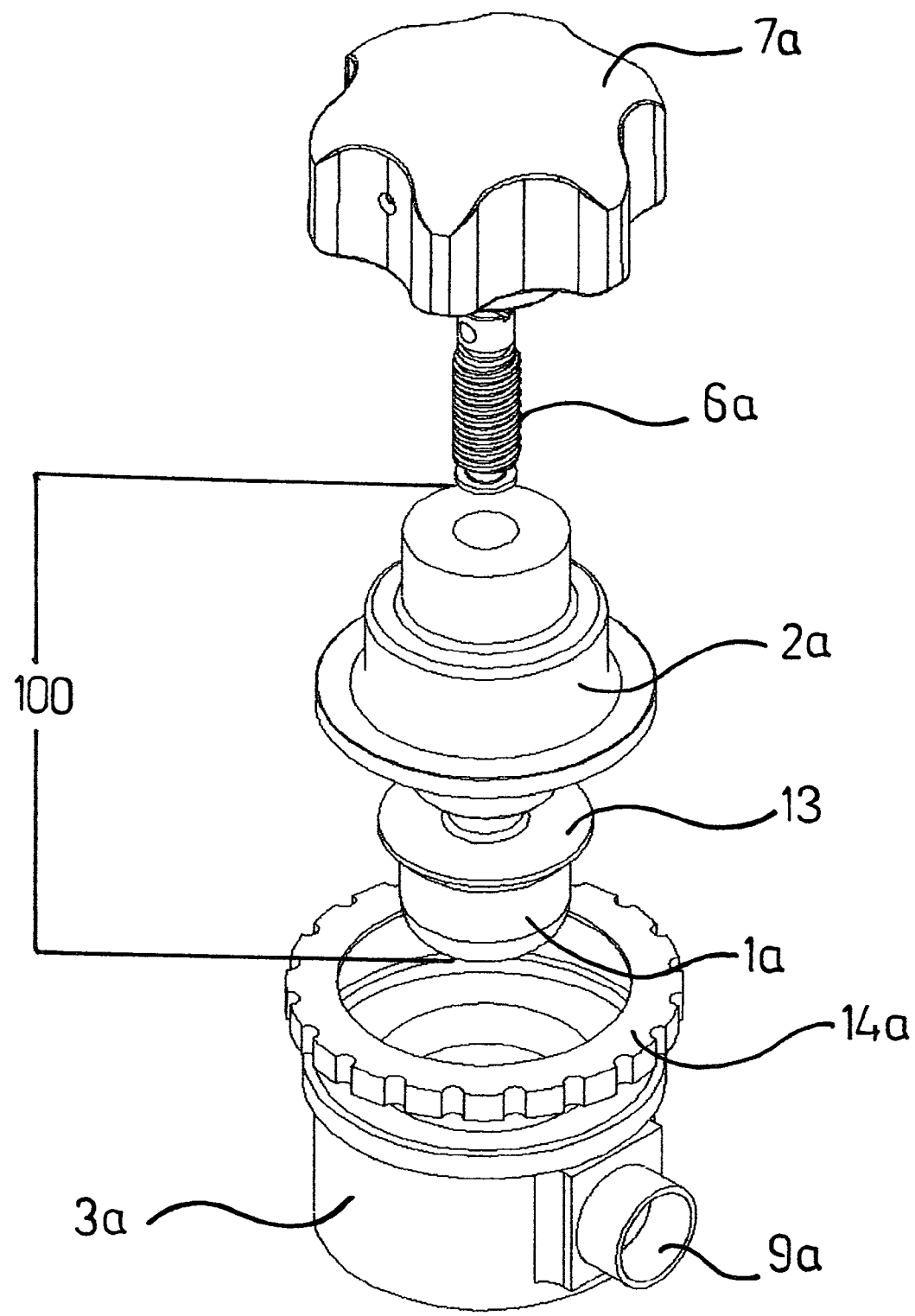
FIG. 3B is an exploded view of the major parts of the prior art radial style diaphragm valve.

A radial style diaphragm valve is shown in FIG. 2. A radial style valve generally comprises a diaphragm 1a, a valve body 3a having a valve seat 12 and a fluid passageway 11a from an inlet 9a to an outlet 10a, and a bonnet 2a comparable with the bonnet 2 of the weir type valve shown in FIG. 1. The bonnet 2a includes an actuator 13 connected to a diaphragm 1a having a spindle 6a connected to a handle or knob 7a. The bonnet, in this type of valve, connects directly to the valve body as shown in FIG. 3B by a retaining nut 14a or a clamping device with the actuator 13 connected to the diaphragm 1a situating inside the bonnet. The turning of the handle or knob 7a, as in the weir type valve controls the position of the diaphragm 1a in relation to the valve seat 12 of the fluid passageway 11a. Fluid flow is stopped when the diaphragm fully presses on the valve seat which closes the passageway. The bonnet 2a including the actuator 13 with the spindle 6a is herein also collectively referred to as bonnet assembly 100.

Figure 4:
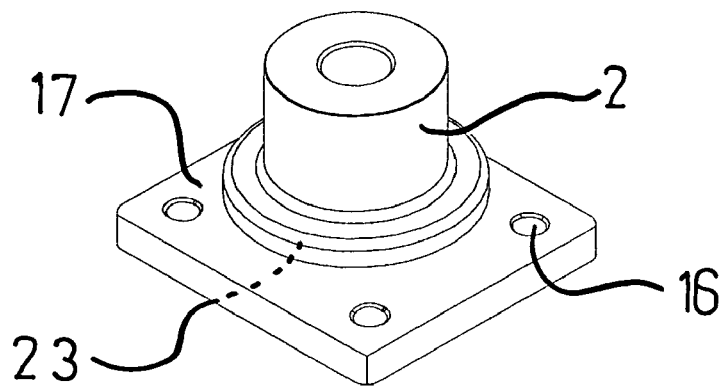
FIG. 4 is an isometric view of a prior art bonnet.
Figure 5:
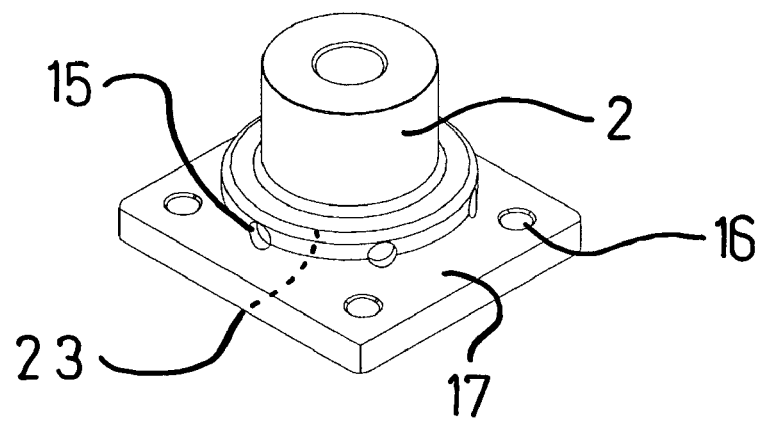
FIG. 5 is an isometric view of a proposed bonnet for a weir type diaphragm valve.
Figure 6:
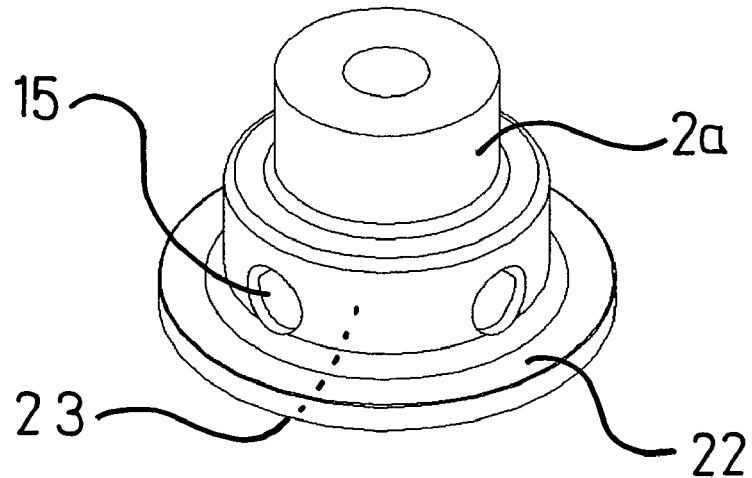
FIG. 6 is an isometric view of a proposed bonnet for a radial style diaphragm valve.
Figure 7:
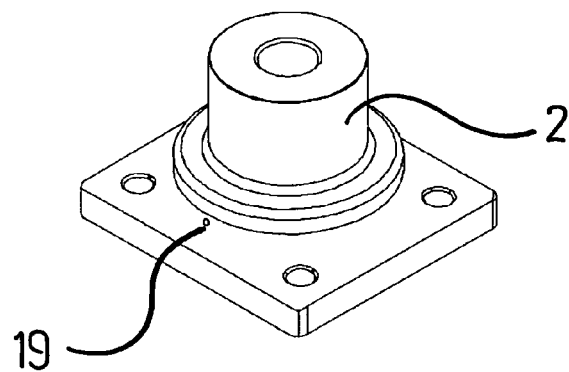
FIG. 7 is an isometric view of a prior art bonnet with a weep-hole.
Figure 8A:
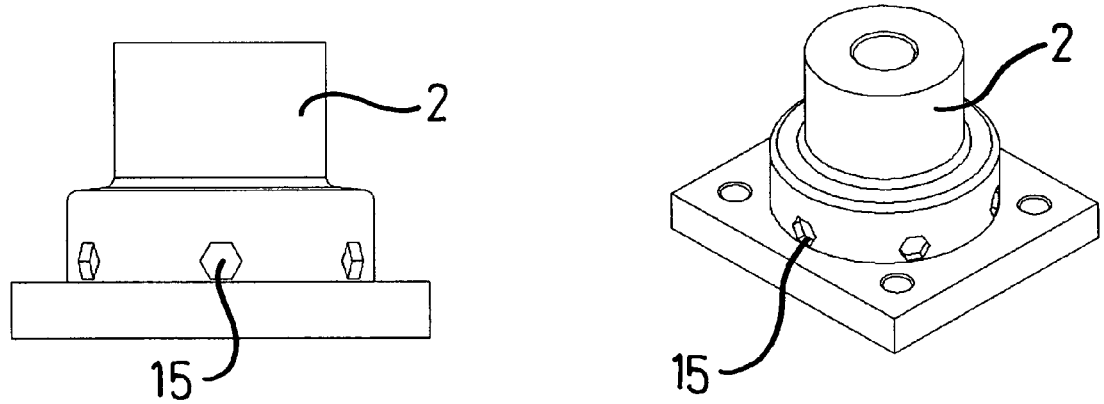
FIGS. 8A-K show examples of different geometrical designs for the orifice in a weir type valve bonnet illustrated in a plan and isometric view.
Figure 8B:
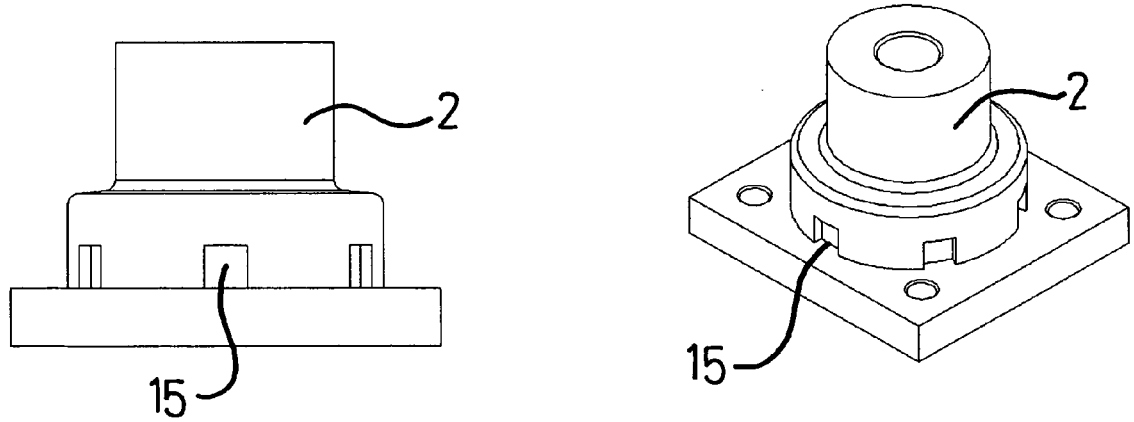
Figure 8C:
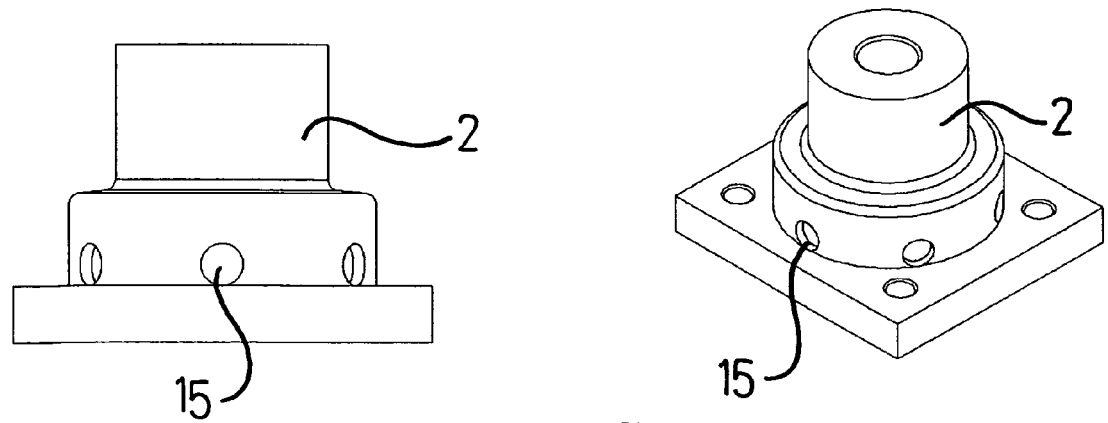
Figure 8D:
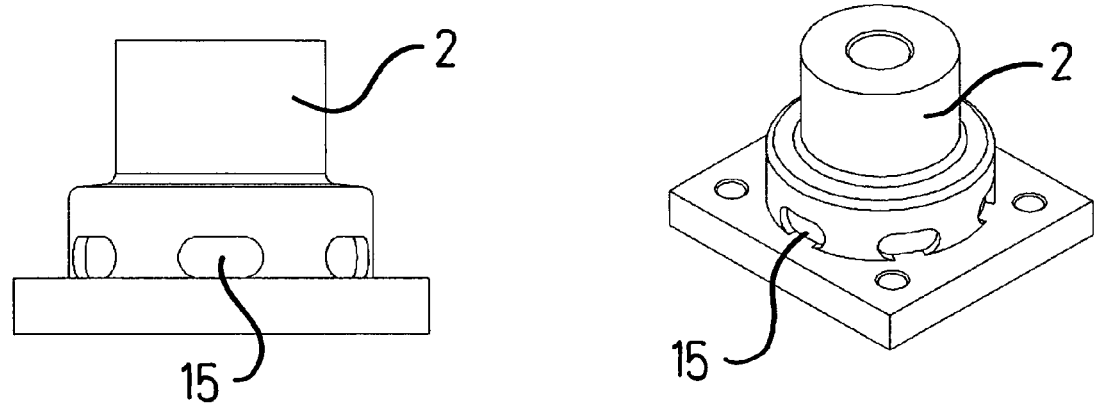
Figure 8E:
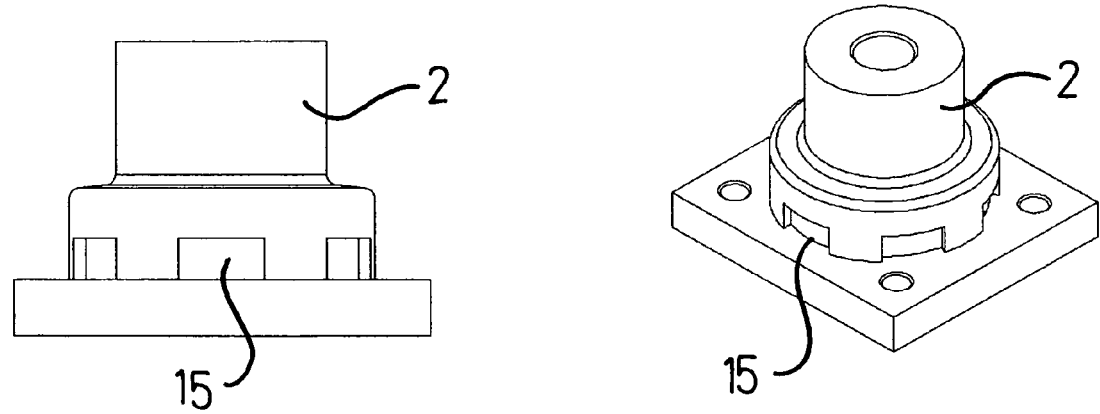
Figure 8F:
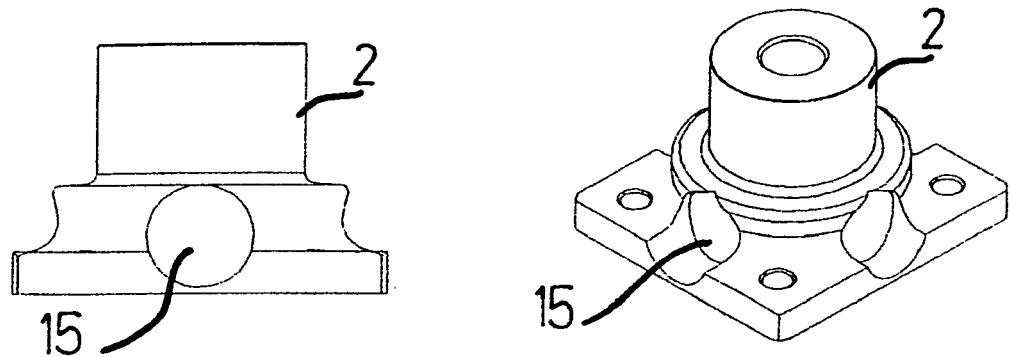
Figure 8G:
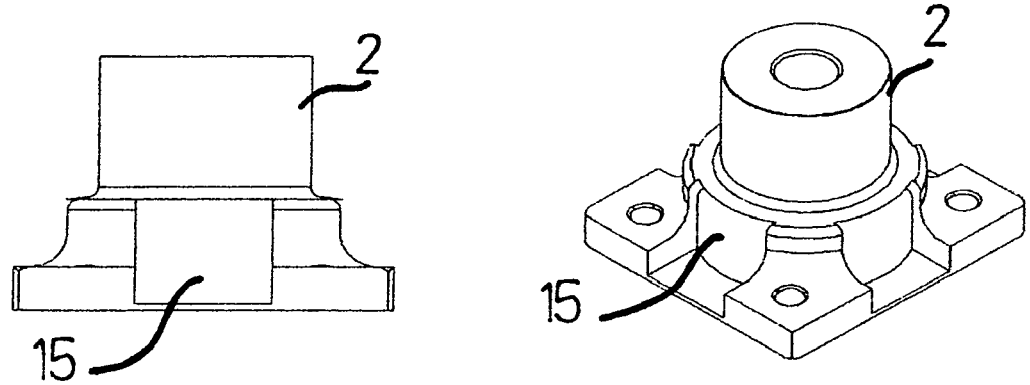
Figure 8H:
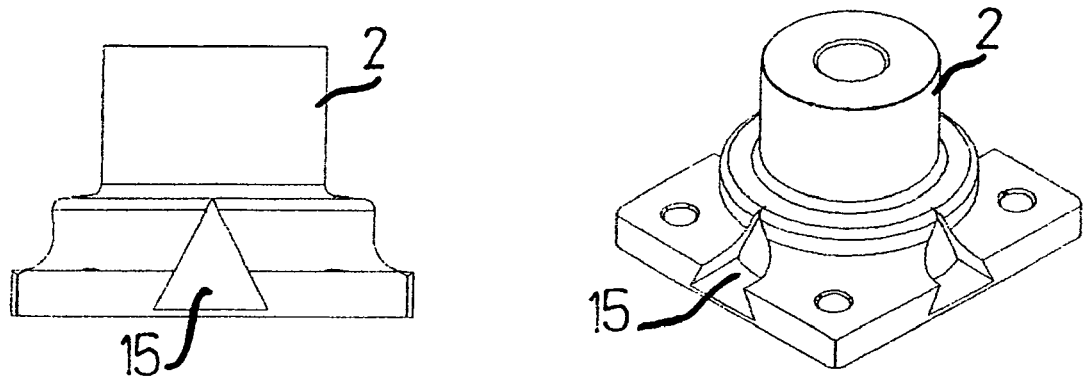
Figure 8I:
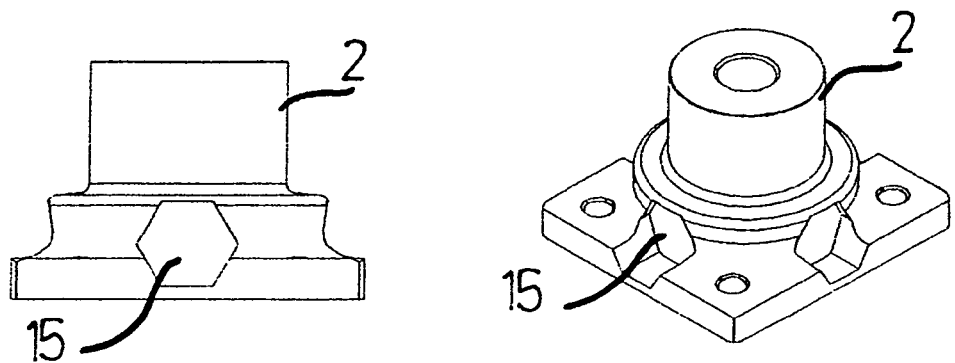
Figure 8J:
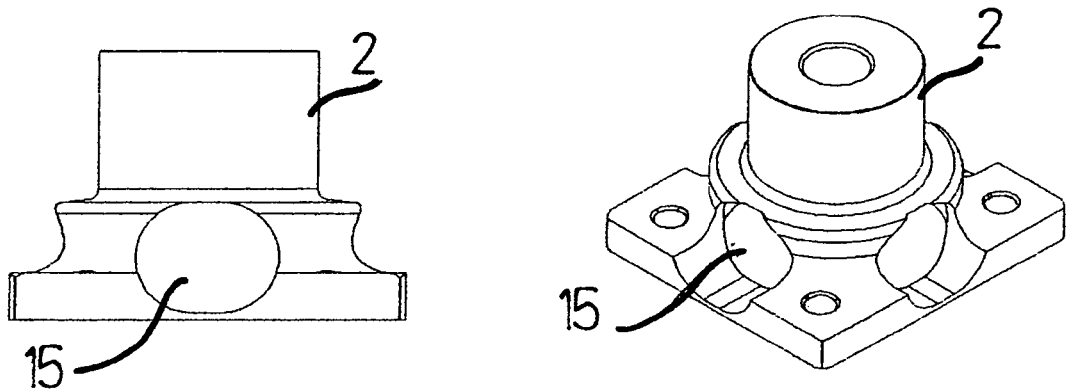
Figure 8K:
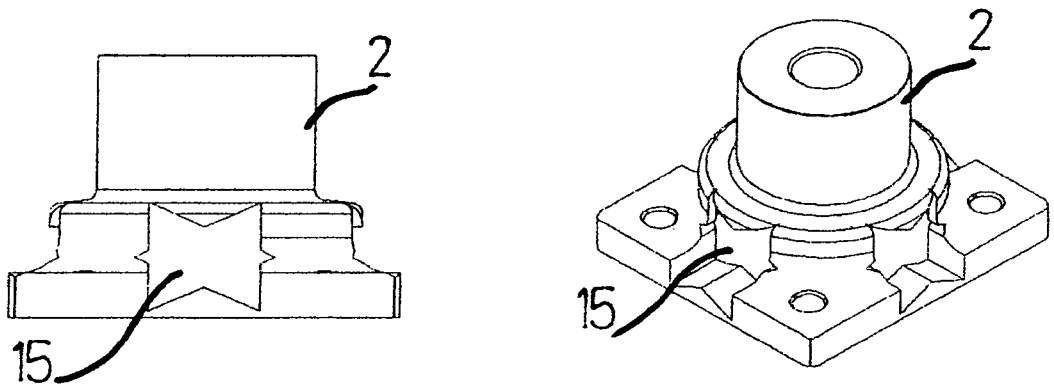
Figure 9A:
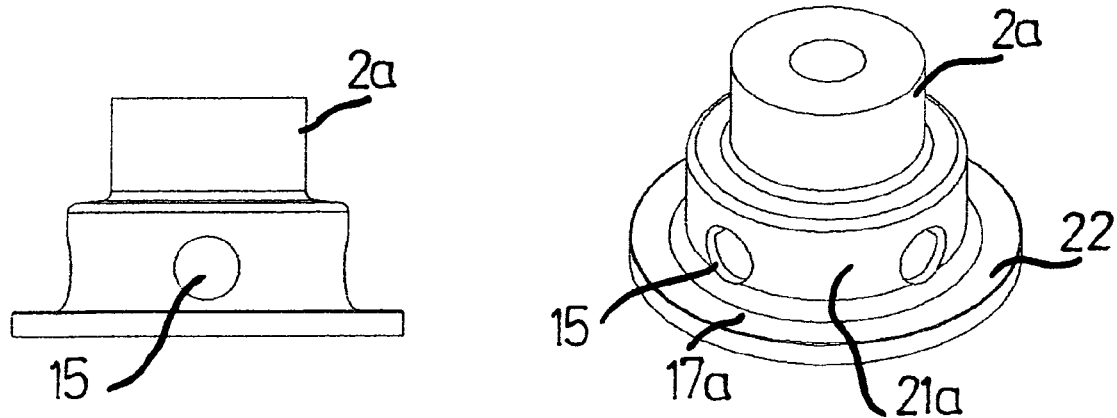
FIGS. 9A-F show examples of different geometrical designs for the orifice in a radial style valve bonnet illustrated in a plan and isometric view.
Figure 9B:
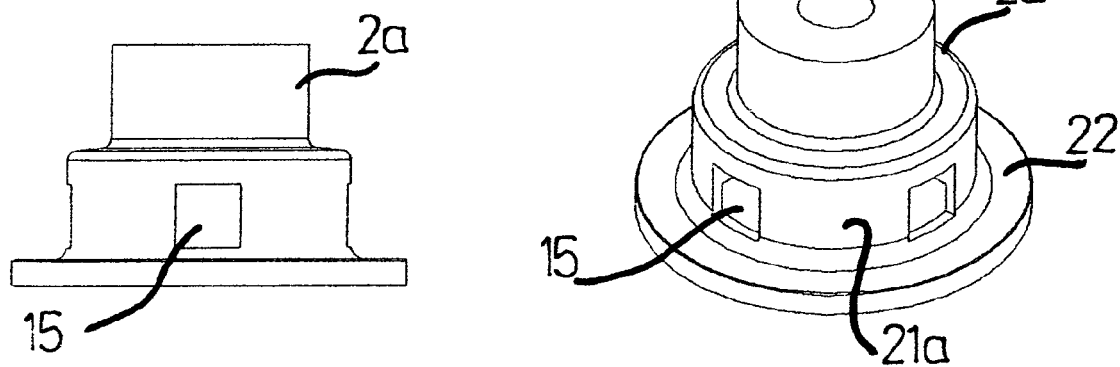
Figure 9C:
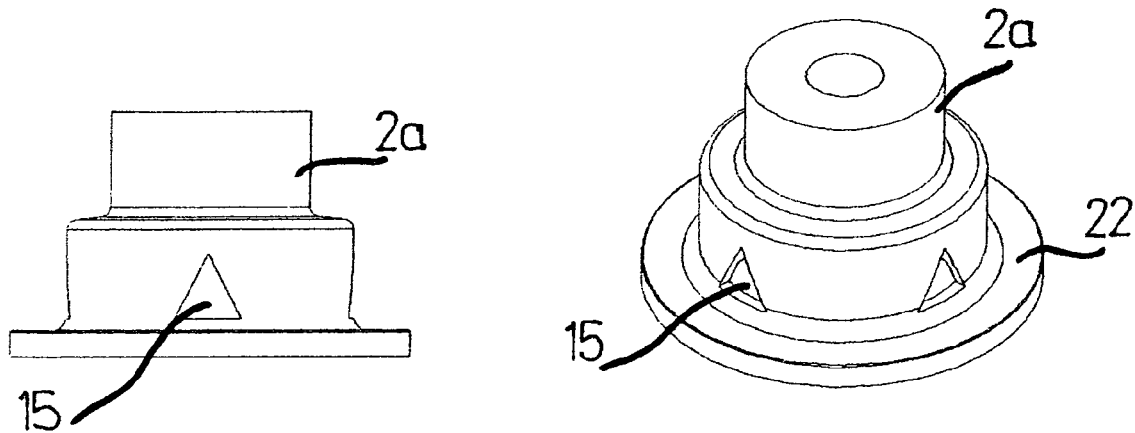
Figure 9D:
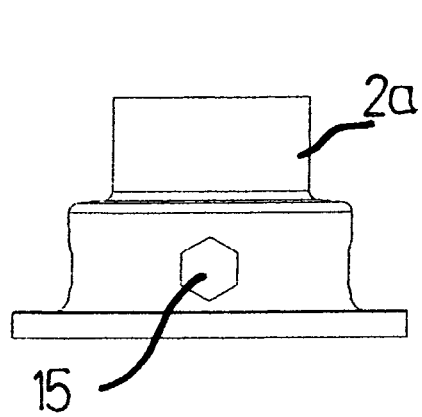
Figure 9D:
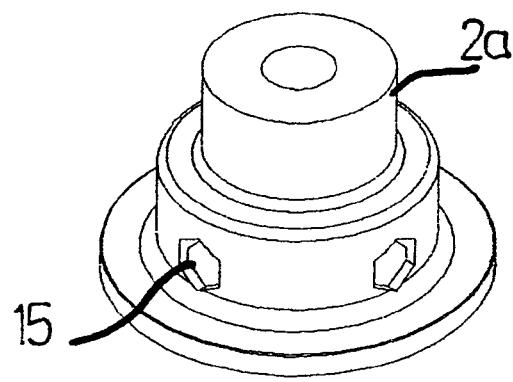
Figure 9E:
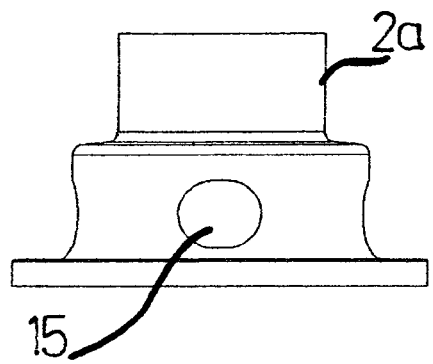
Figure 9E:
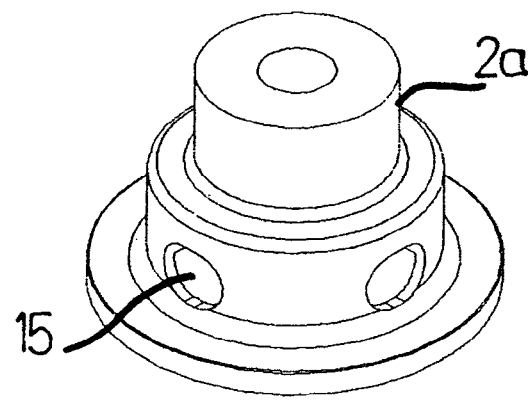
Figure 9F:
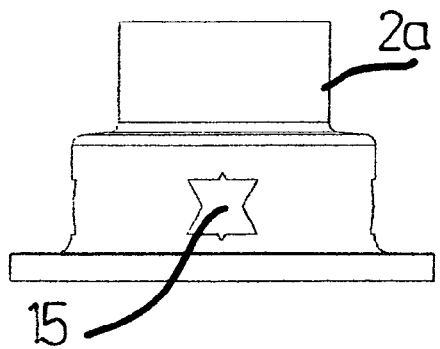
Figure 9F:
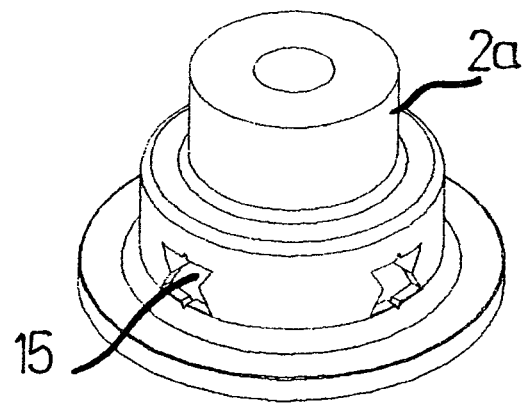
Figure 10:
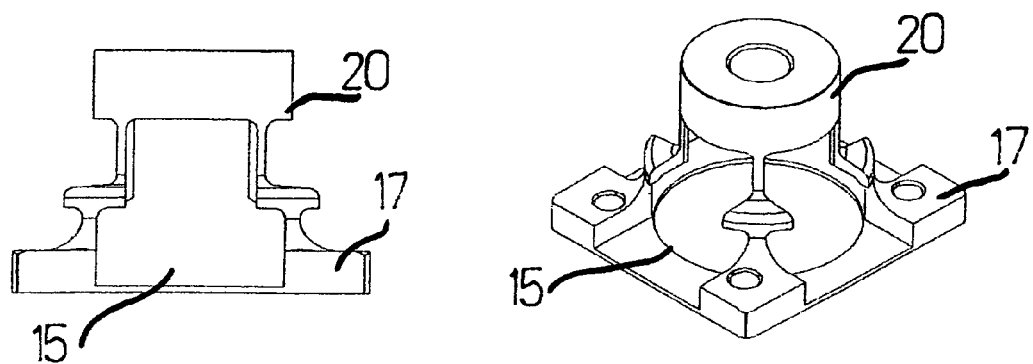
FIG. 10 is a plan and isometric view of an orifice formed by casting showing an orifice covering a bottom end with a portion of the flanged base of a weir type bonnet.
Figure 11:
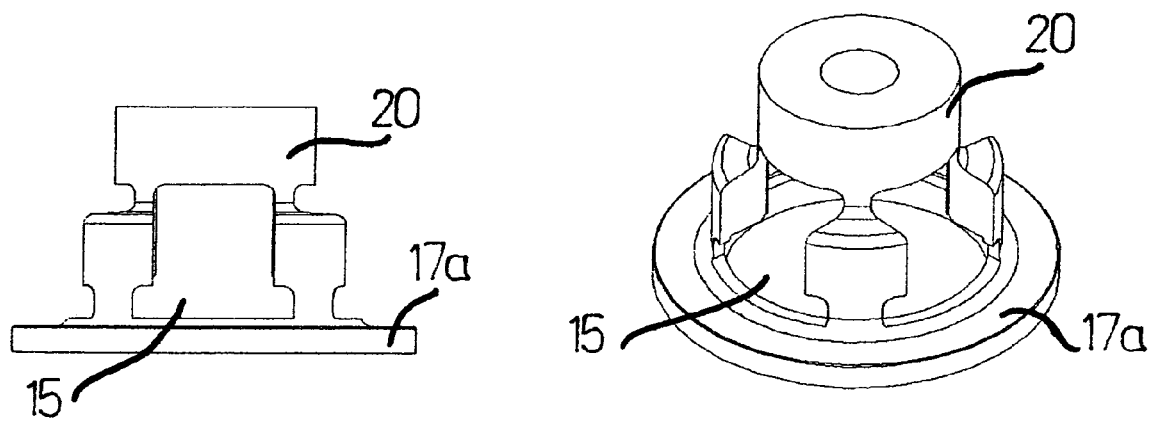
FIG. 11 is a plan and isometric view of an orifice formed by casting showing an orifice covering a bottom end of the top cylindrical section with the bottom cylindrical section above the flanged base of a radial style bonnet.
Figure 12A:
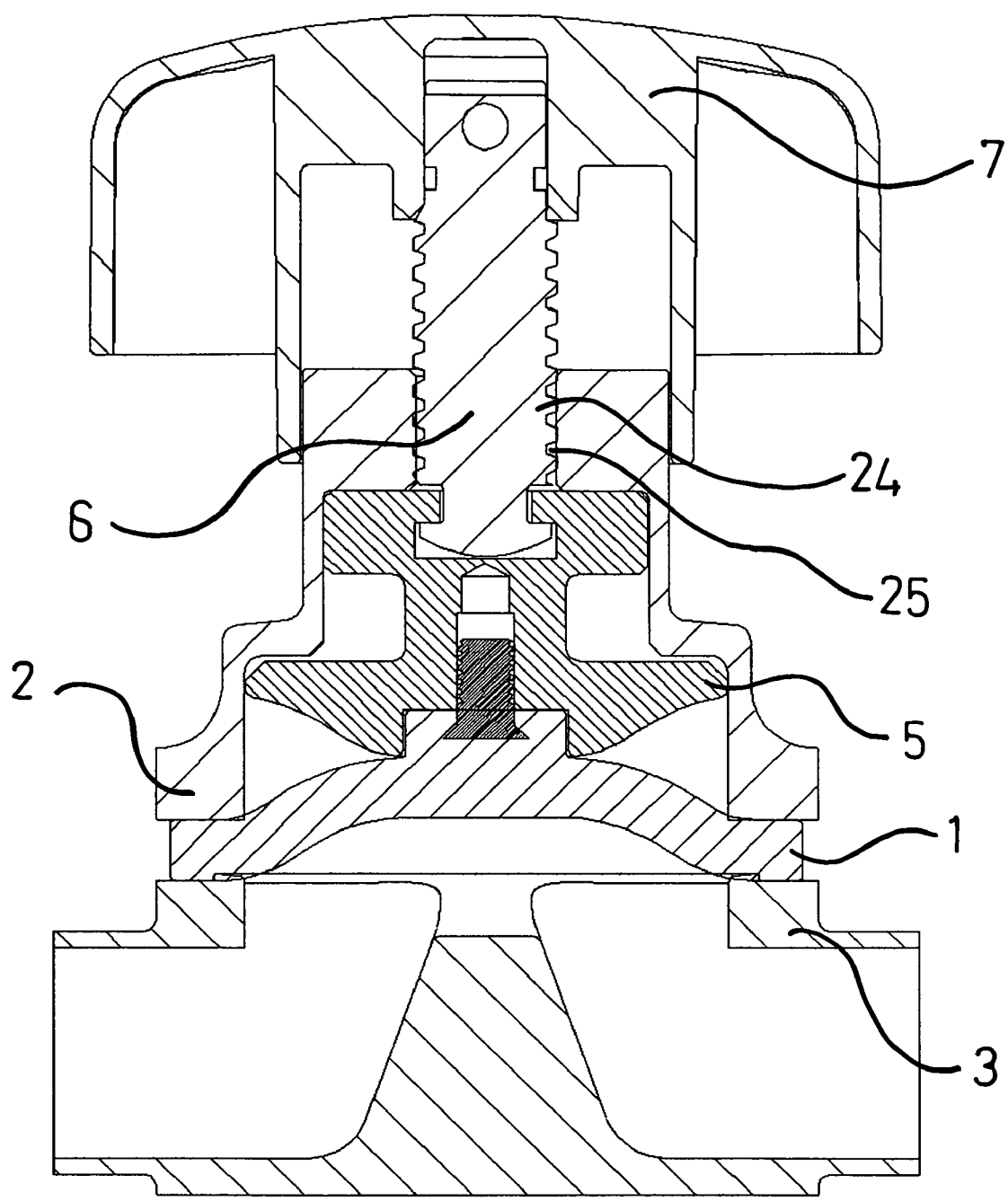
FIG. 12A is a cross sectional view of a prior art weir valve bonnet assembly without a cleaning solution.
Figure 12B:
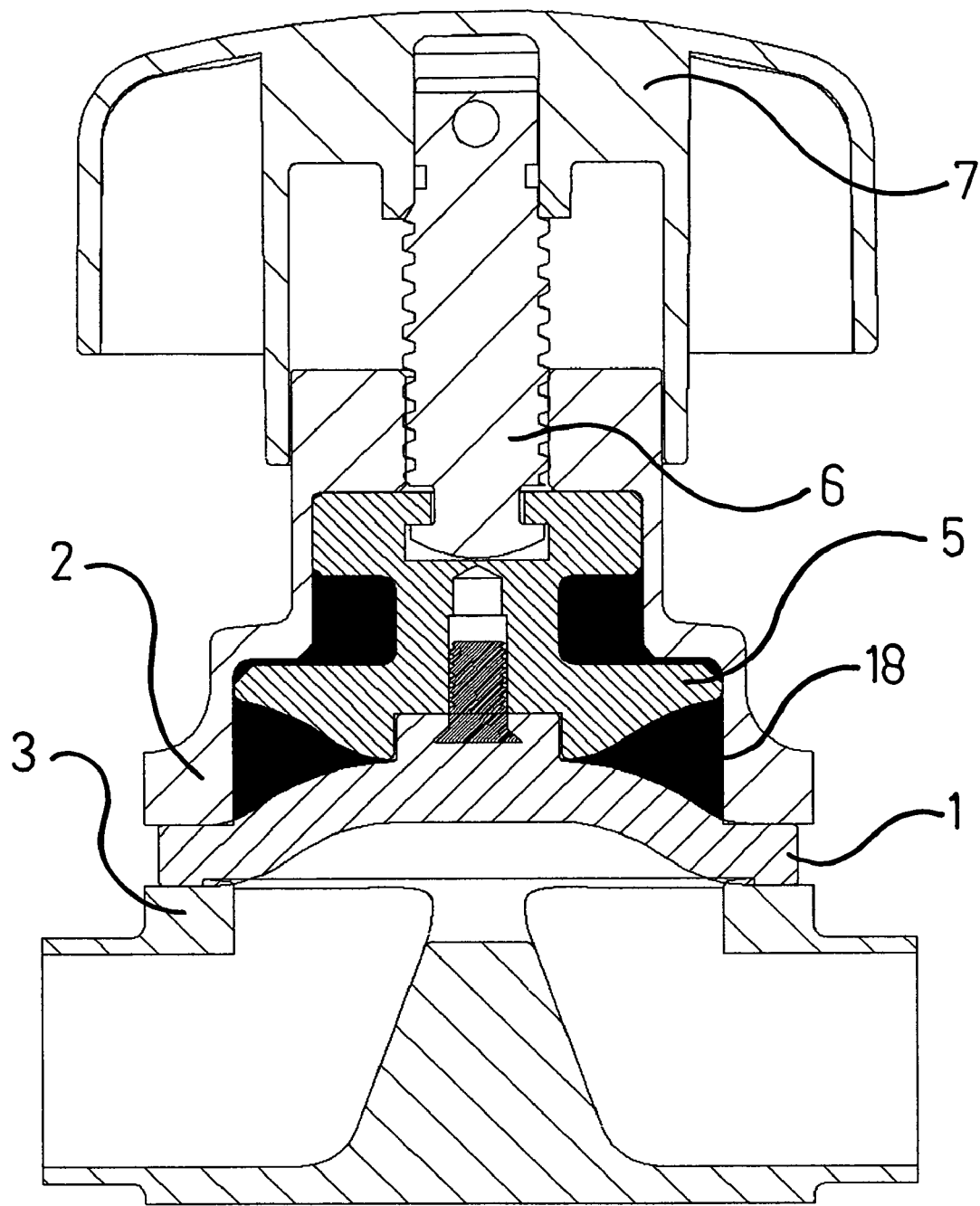
FIG. 12B is a cross sectional view of a prior art weir valve bonnet assembly with a cleaning solution shown in solid black
Figure 13A:
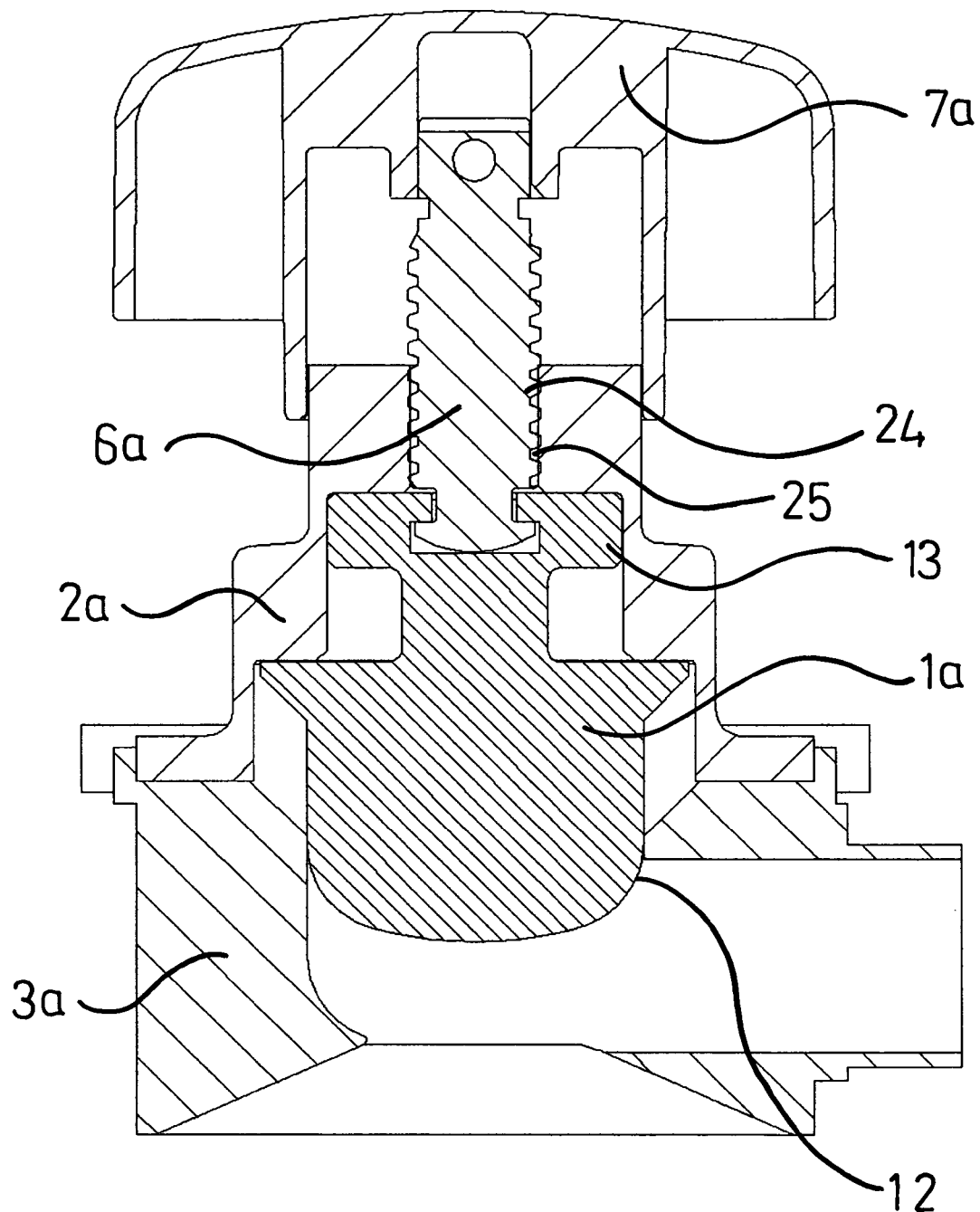
FIG. 13A is a cross sectional view of a prior art radial style valve bonnet assembly without a cleaning solution.
Figure 13B:
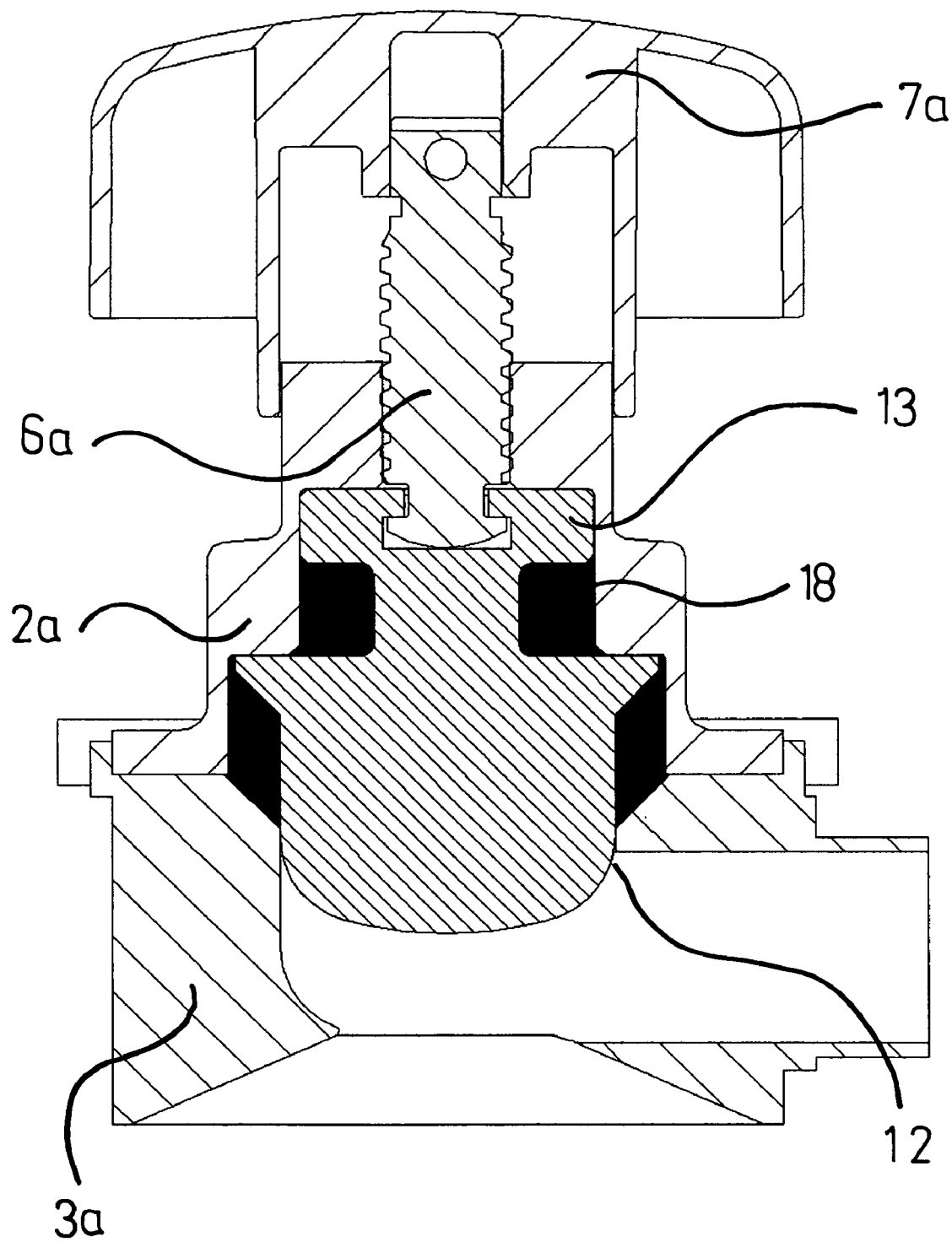
FIG. 13B is a cross sectional view of a prior art radial style valve bonnet assembly with a cleaning solution shown in solid black

The invention is centered at the bonnet assembly 100 because the construction of the valve body of the weir type and radial style valves are such that this section of the valve is already cleanable without disassembly as long as the passageway of the fluid is thoroughly open. Therefore, a detailed description of the valve body and the diaphragm is not necessary. FIGS. 3 and 3B are exploded views of a prior art weir type valve and a prior art radial style valve, respectively. FIGS. 3A and 3C are exploded views of the claimed weir type and radial style valve showing the general parts of the valve and how they relate to each other, most specifically the bonnet 2. FIG. 4 is an isometric view of a prior art bonnet while FIG. 5 is an isometric view of a proposed bonnet for a weir type valve and FIG. 6 is an isometric view of a proposed bonnet for a radial style valve. The bonnet is cylindrical in shape and has an opening at the top surface wherein the spindle traverses to and from the interior of the bonnet as shown in FIGS. 3A, 3C, 12A, 12B, 13A and 13B. The bonnet has a hollow interior fully enclosing the actuator, as shown in FIGS. 12A,B, 13A, B, 14A,B and 15A,B. The bonnet on both weir type valve and radial style valve generally have one hollow cylindrical interior with the radial style valve, however, having two sections within the one hollow cylindrical interior with the top cylindrical section of a smaller diameter than the bottom cylindrical section as shown in FIG. 3B. It is important that the bonnet house the entire actuator to be able to clean this. One difference between the prior art and the claimed bonnets 2 and 2a are the presence of orifices 15 in the bonnet as shown in FIGS. 5 and 6 versus FIG. 4 for the free entry and exit of liquids especially the cleaning and rinsing solutions into and out of the bonnet assembly. With the orifices in the bonnet, either the whole bonnet assembly or the whole valve can be submerged for cleaning without dismantling the valve or the bonnet into its parts. The location, number and size of the orifices is important. As shown in FIGS. 5 and 6, as well as in FIGS. 3A, 3C, 8A-E, and 9A-F, the orifices are located at the junction of the bottom end of the bonnet 2 and the base 17 which extends laterally from the bottom end of the bonnet. For even better ingress and egress through the bonnet assembly, the orifices should originate from the bottom end of the bonnet and extend to the flanged base, etching out and taking portions of the base 17 as shown in FIGS. 8F-K, 10 and 11. Herein, the number designation of the parts are maintained with small letter suffixes added to the radial style valve for parts comparable to the weir type valve. The openings 16 at the base 17 of the bonnet for the prior art and claimed bonnet of a weir type valve as shown in FIG. 4 and FIG. 5 are openings to accommodate the fasteners 14 connecting the bonnet to the diaphragm and the valve body. These should not be confused with the orifices 15 that are used as passageway for the cleaning solution 18. Some commercial bonnets have a port in the bonnet referred to in the industry as weep-hole 19 as shown in FIG. 7. The weep-hole is used only for detecting diaphragm failure. When a diaphragm fails, the fluid leaks out of the diaphragm which is detected by the presence of liquid or moisture at the weep hole. The weep hole is usually limited to one and are usually a small drilled hole or a threaded port that could accommodate a cap for closure. It is designed to have the smallest feasible diameter to maximize surface tension because of the concern for contamination and dust entering the weep hole and also to prevent any external fluid from entering the valve or the bonnet assembly through the weep hole. This concern stems from the present difficulty of cleaning the valve especially the bonnet assembly every after usage. The drilled weep hole is usually no more that ⅛ of an inch in diameter and for the threaded port, they are usually ⅛ inch NPT (national pipe thread). The size of these holes is not sufficient to allow free entry and draining of the cleaning solution 18 when the bonnet is submerged into the cleaning solution. Further, because the weep-hole in existing bonnets is meant to be like a vent, aside from its size, it may not be positioned correctly, that is, not in the right location along the bonnet body or is not sufficient in quantity to allow free entry and exit of a cleaning solution/s.

In contrast, the orifices of the claimed invention are at least three spaced apart around the bottom section of the bonnet with or without a portion of the flange. Spaced apart means, for example, on a cylindrical bonnet with three orifices, the orifices are approximately 120 degrees (120° C.) apart from each other. If there are four orifices, they are approximately 90 degrees from each other. If the bonnet is not cylindrical, the orifices will still be spaced apart at approximately the same distances from each other. The orifices are of a diameter usually greater than the weep-hole to allow free flow of any liquid such as the cleaning and rinsing solutions into the interior of the bonnet after submersion. Free flow or free entry and exit as used herein means that the diameter of the orifice should allow the liquid to enter and exit the orifice without surface tension and without additional external force or pressure to the existing atmospheric pressure to push the liquid into the orifices. A size of at least 3/16" (three-sixteenth of an inch) in diameter or its equivalent on a non-circular orifice was found to be suitable and any surface tension present is minimal. More orifices or larger sized orifices on the surface area of the bonnet provide better accessibility to the components inside the bonnet as well as provide drainability. The number and size of the orifices on the surface area of the bonnet is limited only by the structural strength required for the bonnet to adequately house the actuator assembly. These orifices 15 can have different geometric designs, meaning, one bonnet can have a plurality of the same square orifices while another bonnet can have a plurality of all rounded orifices. Some examples of the different geometric designs illustrated in a plan and isometric views for the orifices on a weir type valve are shown in FIGS. 8A-8K. FIGS. 9A-9F show the different geometrical designs of the orifices on a radial style valve. It is obvious that there are other geometrical designs that are not shown here. Further, a bonnet can also have a mixed design of orifices without affecting the intended purpose because what is important is for a liquid to be able to ingress and egress the bonnet freely. However, having different shapes of orifices in a given bonnet is not aesthetically preferred. The orifices can be formed by casting, boring or other means known in the art. The peripheral edges of the orifices should be smoothened, that is without sharp edges or burr free to avoid or reduce any liquid hold up due to surface tension as well as avoid harboring microbial build-up on the rough surfaces. To have larger orifices, casting is a preferred method of forming the orifice. An orifice 15 formed by casting a bottom end 20 with the flanged base 17 of the weir type bonnet is shown in FIG. 10 in a plan and isometric view or with the flanged base 17a of the radial style bonnet as shown in FIG. 11 in a plan and isometric view. These cast type orifices will allow the best ingress and egress of the cleaning and rinsing solutions through the bonnet assembly. The orifices formed by methods usually other than casting shown in FIGS. 8A-8E, are usually confined at the lateral surface of the bonnet just above the base 17 or the orifice can originate at the lateral surface of the bonnet just above the base and extend to the base 17 of the bonnet as shown in FIGS. 8F-8K. In the latter, the orifice takes a portion of the bottom end and a portion of the base 17 of the bonnet. This results in a wider orifice or opening for better fluid flow. In the radial style valve, the orifices are at the lateral surface of the larger diameter section 21a because the flange 22 of base 17a is needed to connect the bonnet 2a with the valve body 3a using the retaining nut or clamp 14a and the orifices should be located at the lowest possible section of the bonnet just above the flange of the base. The orifices 15 are located at these positions because they allow drainage of the cleaning solution. The presence of the orifices in the bonnet removes the necessity of having a weep hole because the orifices can be used to detect diaphragm failure.

Figure 14A:
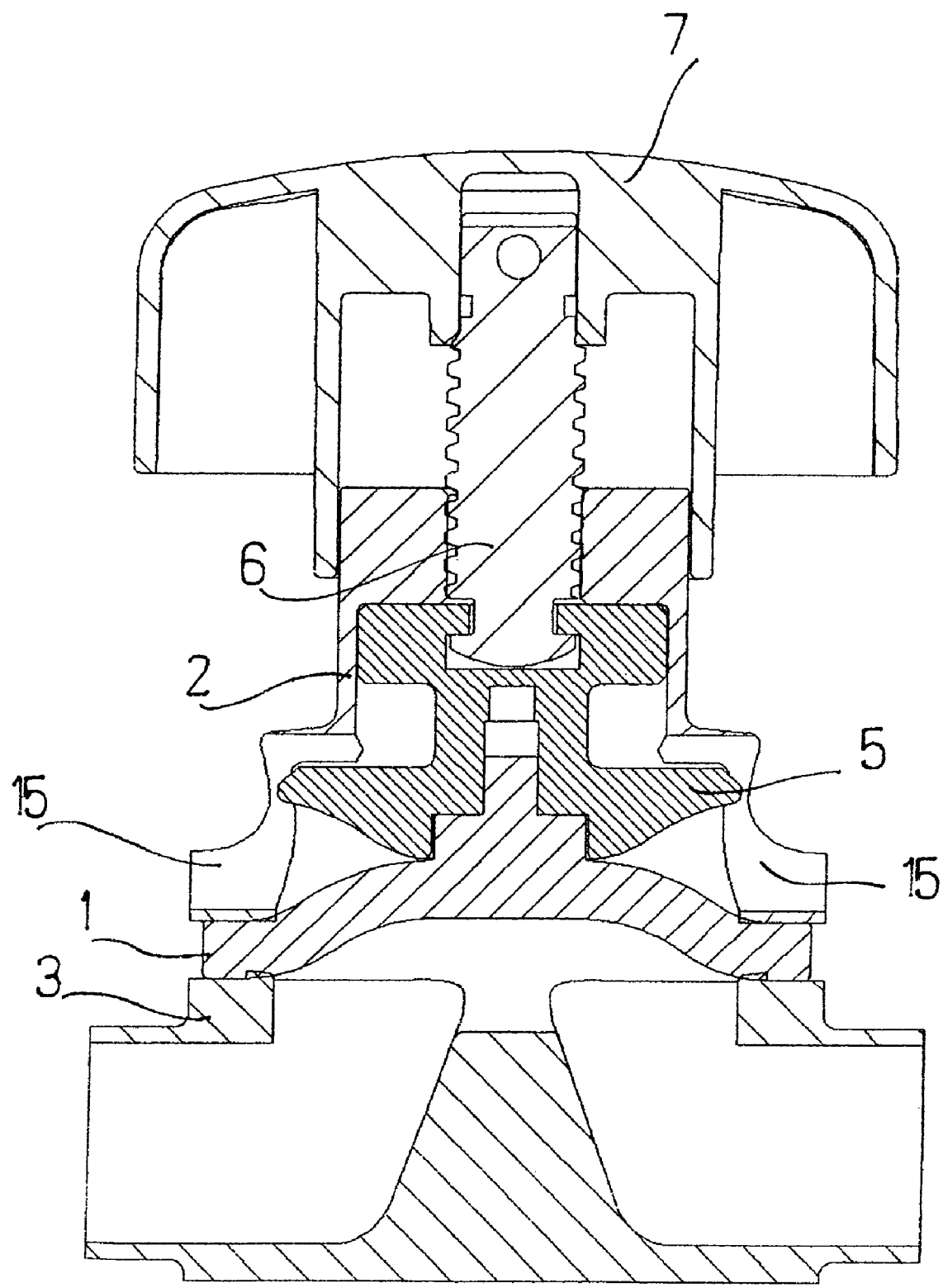
FIG. 14A is a cross sectional view of the improved weir valve bonnet assembly showing the orifice with the liquid accessible areas unhatched without a cleaning solution.
Figure 14B:
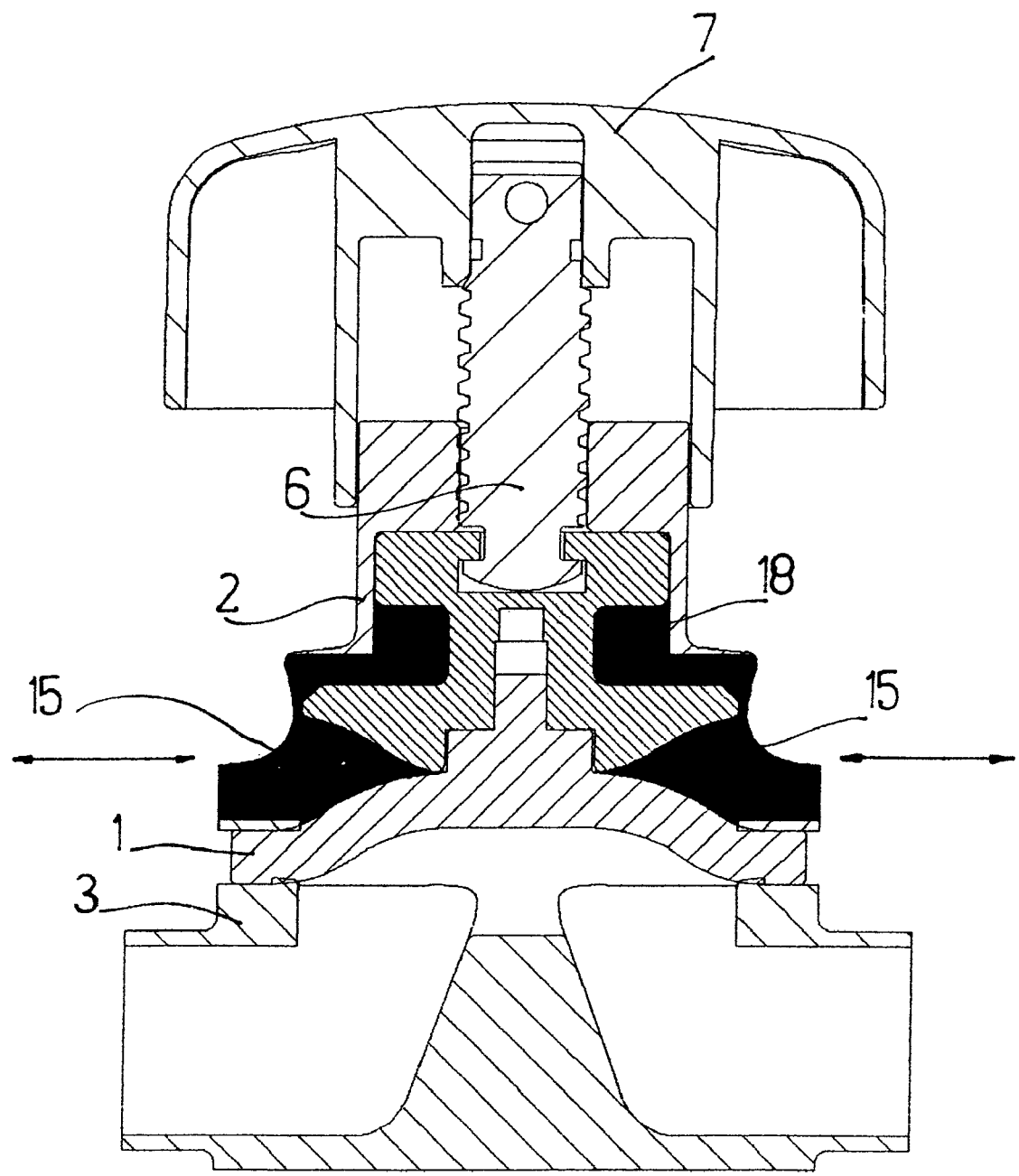
FIG. 14B is a cross sectional view of the improved weir valve bonnet assembly with a cleaning solution inside the bonnet shown in solid black.
Figure 15A:
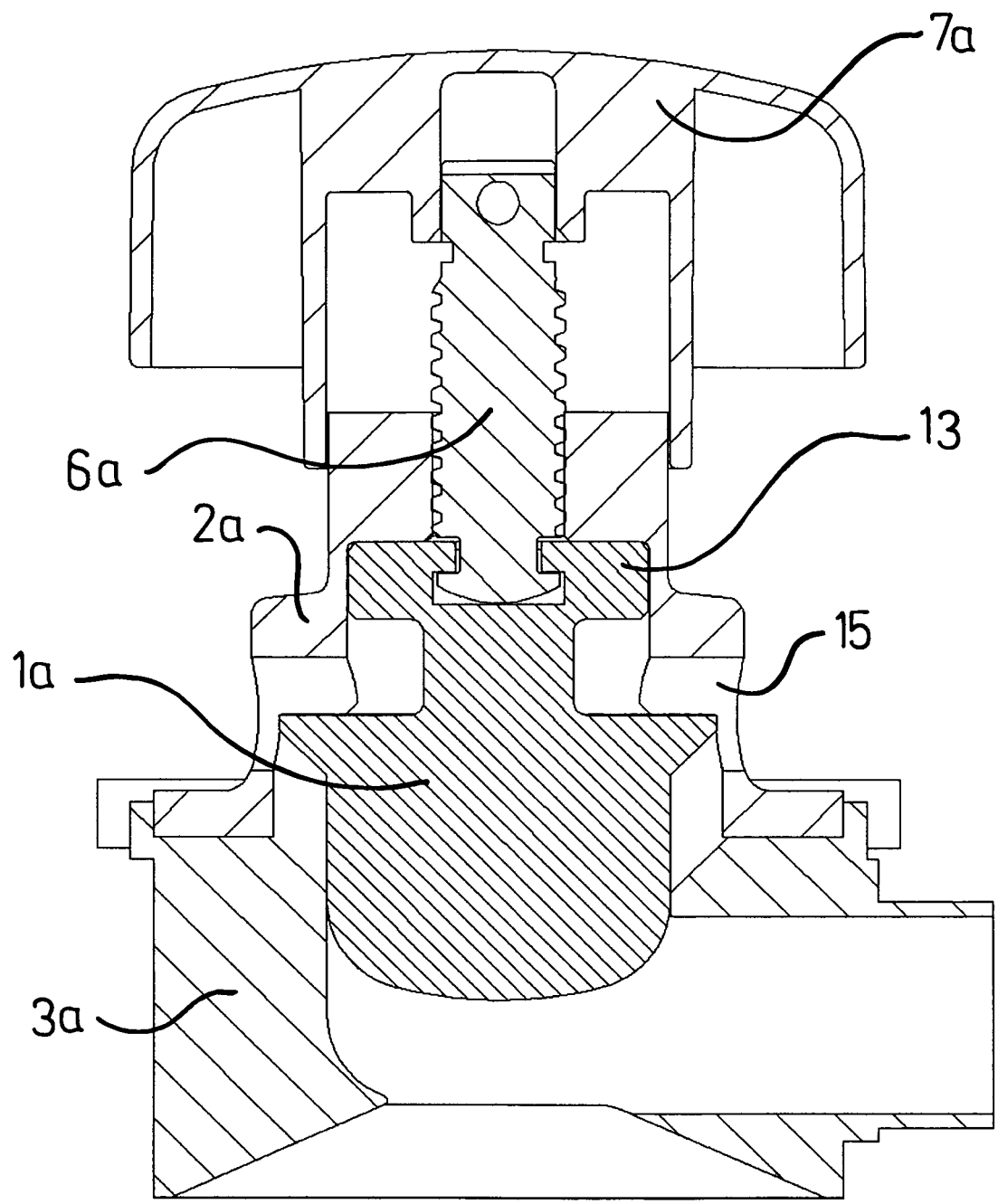
FIG. 15A is a cross sectional view of the improved radial style valve bonnet assembly without a cleaning solution showing the orifice with the liquid accessible areas unhatched.
Figure 15B:
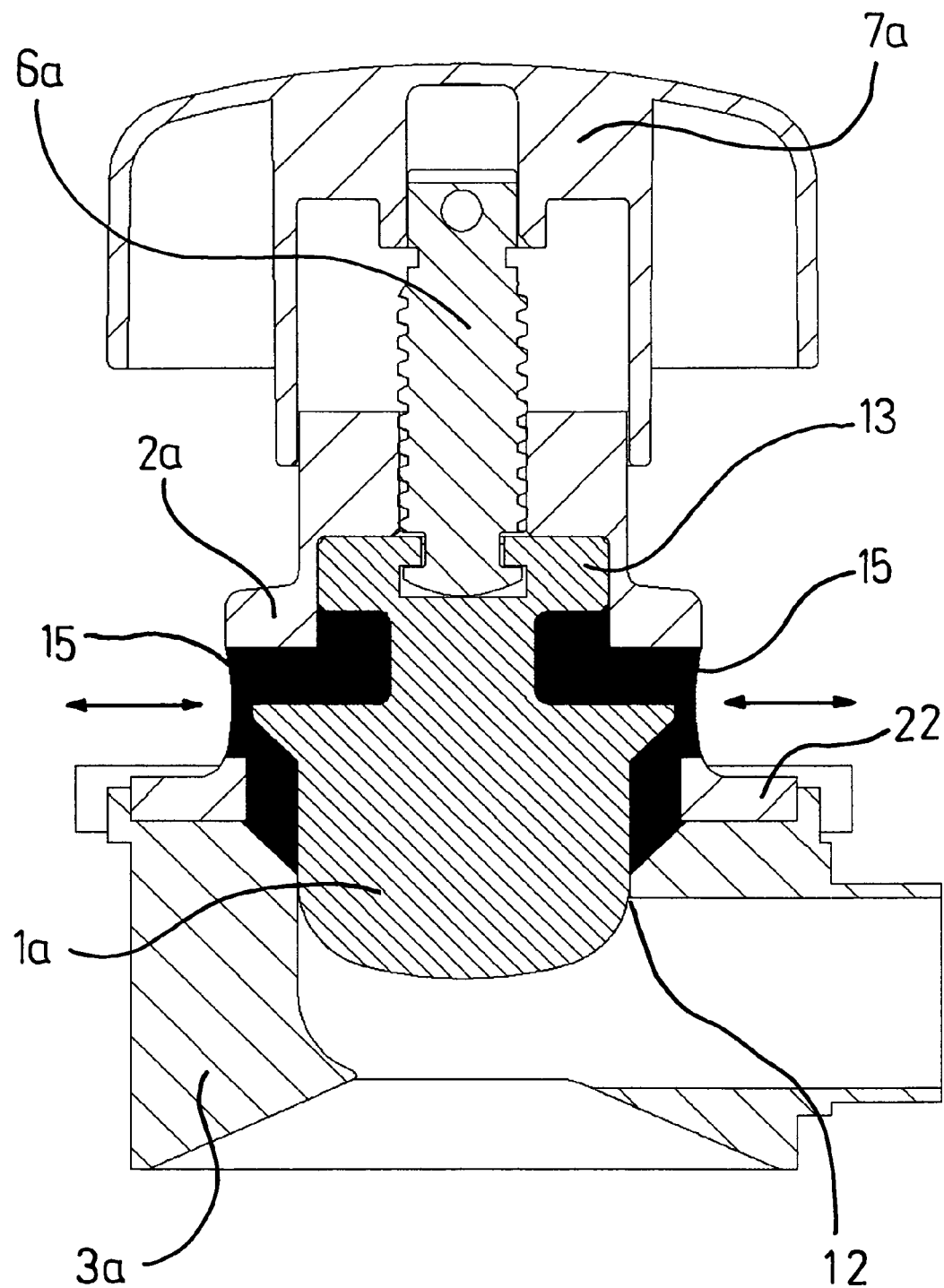
FIG. 15B is a cross sectional view of the improved radial style valve bonnet assembly with a cleaning solution inside the bonnet shown in solid black.

With the existing valves, the cleaning solution or any other liquid enters the interior of the bonnet but has no adequate number of orifices for easy exit or for rapidly enveloping the entire bonnet assembly 100 as shown in FIGS. 12A, 12B, 13A and 13B. Consequently, thorough cleaning of the bonnet or the whole valve by submersion can not be achieved. Here, the cleaning solution 18 enter the assembled bonnet assembly 100 mainly through the bottom face 23 (see FIGS. 4, 5, and 6 for location indicator) of the bonnet when this is not attached to the diaphragm or the valve and has to exit at the same location 23. Therefore, when the assembled bonnet assembly 100 is submerged to the cleaning solution, the solution will tend to stay inside the bonnet especially those that have managed to rise above the actuator resulting in inferior cleaning of the parts because the cleaning solution, dirt and contaminants will not be thoroughly swept out of the interior of the bonnet. Also, having no port/s for free entry and exit of the cleaning solution, it would be difficult to thoroughly wash an assembled bonnet assembly with an automatic washer. With the proposed bonnet assembly, a liquid or solution such as the cleaning solution 18 enters and exits the assembled bonnet assembly 100 through the orifices 15 and through the open bottom face 23 of the bonnet (if open), goes around the parts of the actuator assembly housed inside the bonnet and exits at the orifices 15 and the bottom face 23 of the bonnet (if unobstructed by the diaphragm and/or the valve body) as shown in FIGS. 14B and 15B. There is a free flow of the cleaning solution and unobstructed contact with the parts of the actuator assembly resulting in a thorough cleaning of the bonnet assembly without the need of disassembling the bonnet assembly. Cleaning is also achieved with the bonnet attached to the rest of the parts of the valve, that is, without the bottom face 23 open because of the orifices on the bonnet. When cleaning the entire valve by submersion, the passageway of the fluid at the valve body should be wide open, that is, the diaphragm should not be pressing on the weir or at the valve seat at all. The nature and composition of the cleaning solution and the cleaning conditions such as time, temperature, etc. are at the discretion of the user/manufacturer and are usually dependent upon the practice of the industry, a proprietary information kept by a manufacturer, or one dictated by a regulatory body overseeing the industry. A cleaning solution typically ranges from an acidic pH of 2 to a basic pH of 10. These can also be organic or inorganic in nature or a combination of both. The cleaning solutions may be one or more types of solution which can be applied batch wise in separate steps. The cleaning process, especially one done by submersion can be made more effective by the introduction of sonic waves or by stirring the cleaning solutions during the washing procedure or by recirculating the cleaning solution. Cleaning by submersion is generally done by soaking or submersing the bonnet or the weir type and radial style valve in a cleaning solution bath, removing the valve or bonnet from the cleaning solution and rinsing the valve or bonnet until free from the cleaning solution, followed by drying the bonnet or valve. This process can be manual or automated such as by an automated COP (clean out of place) parts washer.

Due to the constant exposure of the valve in general and the bonnet assembly, in particular, to the cleaning solutions, the valve or the bonnet assembly should be made up of corrosion resistant materials such as stainless steel and performance engineered polymeric materials. The term performance engineered plastic or polymeric material is used in the art to refer to plastic or polymeric materials formulated to impart a desired performance characteristic/s. The type of performance engineered polymeric material would largely depend on the type of fluid or cleaning solution contacting the valve and the process conditions that the valves are subjected to. The performance engineered polymeric material used herein posses among others the characteristics of non-galling, low coefficient of friction, non-corrosive and for some industries, non-toxic or approved by the regulating agency overseeing the product or fluid being processed with the valve. There is a list of performance engineered polymeric materials that can be used. As in any material, some are better performing than the others. Examples (not a complete list) of performance engineered polymeric material are acrylonitrile butadiene styrene (ABS), fluoropolymers, polyamides (Pas-Nylon), polyarylates (PAryls), polycarbonate (PC), thermoplastic polyesters (PET, PBT), thermoplastic polyimides (PI, PAI, PEI), polyoxymethylene (POM Acetal), polyphenylene oxide (PPO), polyaryletherketones (PEEK, PEK), polysulphones (Psul, PES), polyphenylene sulphide (PPS), liquid crystal polymers (LCPs), fluorinated ethylene propylene (FEP), perfluoroalkoxy (PFA), polyvinylidene fluoride (PVDF), and some amorphous and semi-crystalline thermoplastics. Corrosion causes gradual destruction of a metal or alloy due to an action of a chemical agent or due to chemical processes such as oxidation. In the bonnet assembly, the spindle 6 and 6a, especially those having threaded 24 portions, that allow the movement of the diaphragm 1 and 1a upon the turn of the handle 7 and 7a, should be made not only of a corrosion resistant material but also one that withstands constant frictional rubbing between the surface of the spindle, herein illustrated as threads 24, and the matching/receiving or contacting surface 25 on the actuator to avoid galling which eventually makes the valve non-functional due to seizure or damage especially on the threads if the spindle is threaded. If the bonnet assembly or the valve in general consist of other parts that are threaded, these parts too should be made or fabricated with a corrosion and galling resistant material. Aside from the spindle, the other parts of the actuator assembly receiving or contacting with the surface of the spindle and the bonnet itself can also be fabricated with a performance engineered polymeric material. Present bonnet assemblies usually have the spindle or other parts within the bonnet assembly made of brass or bronze because they are less expensive. Brass and bronze are more susceptible to corrosion. Stainless steel material, on the other hand, although it would improve the life of the spindle and any other threaded part/s of the valve, should be periodically lubricated to minimize the damage due to frictional contact between the spindle and the matching or contacting surfaces of the actuator. The lubricant, often times, are not compatible with the liquid being processed and would present a problem in itself as a contaminant that may be able to seep into the fluid. Also, with the constant contact of the surfaces with the cleaning solutions which may be of extreme pH conditions or of a chemical composition that can react with the lubricant, the lubricant could likely break down into smaller molecular compounds whose effect in the process fluid is mostly unknown and would require a big investment to determine. Stainless steel is susceptible to a galling problem causing an eventual flaking out of contaminants to the environment which would include the fluid contacting the stainless steel. In lieu of this, substituting the spindle or any threaded component of the valve or the bonnet assembly with a performance engineered polymeric material that would withstand corrosion and galling is another aspect being proposed herein to improve the performance and functional life of the valve in general and the bonnet assembly in particular. Providing the actuator part or component directly contacting with the spindle with this performance engineered material especially those that are threaded to match with a threaded spindle, is also recommended. The bonnet housing the actuator assembly can likewise be fabricated with this material.

While the embodiments of the present invention have been described, it should be understood that various changes, adaptations, and modifications may be made therein without departing from the spirit of the invention and the scope of the claims.

The invention claimed is:
1. A sanitary hygienic weir type diaphragm valve having an improved sanitary bonnet assembly, comprising:
 a valve body having a weir transposed intermediate and transversely of an inlet and an outlet port of a passageway of the valve body wherein a fluid flows;
 a hollow bonnet having an opening at a top surface and a flanged base extending from a bottom peripheral end, the hollow bonnet fully housing an actuator connected to a spindle moving up and down through the top opening of the bonnet, the actuator connected to the spindle together forming an actuator assembly;

a handle connected to the spindle of the actuator assembly causing the upwards and downwards motion of the spindle in and out of the bonnet and together with the actuator controls the amount of pressure applied to a diaphragm situated between the bonnet and the valve body; and, at least three spaced apart orifices of a size and shape allowing free entry and exit of a liquid introduced into the bonnet, the orifices located at a lowest possible section of the bonnet at a junction of the bottom peripheral end of the bonnet and the flanged base pressing on the peripheral ends of the diaphragm allowing the liquid to thoroughly contact and exit the bonnet assembly, thereby enabling a thorough cleaning of the valve by submersion without the need of disassembly; and, means of connecting the bonnet assembly to the other components of the valve.

2. The sanitary hygienic valve of claim 1 wherein the liquid is a cleaning solution.

3. The sanitary hygienic valve of claim 1 wherein the orifices are of same or different geometric shape and design.

4. The sanitary hygienic valve of claim 3 wherein the orifices are circular in shape.

5. The sanitary hygienic valve of claim 4 wherein the circular orifices are at least 3/16 of an inch in diameter.

6. The sanitary hygienic valve of claim 1 wherein the orifices are formed by leaving parts of a bottom end of the hollow bonnet adjoining with the flanged base of the hollow bonnet.

7. The sanitary hygienic valve of claim 1 wherein the orifices originate from a bottom end of the bonnet extending to the flanged base, etching out and taking a portion of the flanged base.

8. The sanitary hygienic valve of claim 1 wherein the number and size of the orifices are dependent upon the surface area of the bonnet and the structural strength of the bonnet required to house the actuator assembly.

9. The sanitary hygienic valve of claim 1 wherein the bonnet has a hollow cylindrical interior.

10. The sanitary hygienic valve of claim 1 wherein the valve having the bonnet assembly or the bonnet assembly is made of a corrosion and galling resistant material.

11. The sanitary hygienic valve of claim 1 wherein the actuator assembly is made of a corrosion and galling resistant material.

12. A sanitary hygienic radial style diaphragm valve having an improved sanitary bonnet assembly, comprising:
a valve body having a valve seat and a fluid passageway wherein a fluid flows;
a hollow bonnet having an opening at a top surface and a flanged base extending from a bottom peripheral end, the hollow bonnet fully housing an actuator connected to a spindle moving up and down through the top opening of the bonnet, the actuator connected to the spindle together forming an actuator assembly made of a corrosion and galling resistant performance engineered polymeric material, the spindle having threads engaging a matching surface on the actuator;

a handle connected to the spindle of the actuator assembly causing the spindle to engage upwards and downwards along the matching surface of the actuator as the handle moves the actuator assembly up and down; and, at least three spaced apart orifices allowing free entry and exit of a liquid introduced into the bonnet located at a lowest possible section of the bonnet just above a junction between the bottom peripheral end of the bonnet and the flanged base, the flanged base connecting directly to the valve body and the liquid thoroughly contacting and exiting the bonnet assembly thereby thoroughly cleaning the radial style valve by submersion into a cleaning solution without the need of disassembly; and, means for connecting the bonnet assembly to other components of the valve.

13. The sanitary hygienic valve of claim 12 wherein the liquid is a cleaning solution.

14. The sanitary hygienic valve of claim 12 wherein the orifices are of same or different geometric shape and design.

15. The sanitary hygienic valve of claim 12 wherein the orifices are formed by leaving parts of a bottom end of the hollow bonnet adjoining with the flanged base of the hollow bonnet.

16. The sanitary hygienic valve of claim 12 wherein the orifices originate from a bottom end of the bonnet extending to the flanged base, etching out and taking a portion of the flanged base.

17. The sanitary hygienic valve of claim 12 wherein the number and size of the orifices are dependent upon the surface area of the bonnet and the structural strength of the bonnet required to house the actuator assembly.

18. The sanitary hygienic valve of claim 12 wherein the hollow bonnet has two sections within a hollow interior, a top cylindrical shaped interior of a smaller diameter and a bottom cylindrical shaped interior of a larger diameter, the hollow bonnet fully housing the actuator of the actuator assembly, the interior with the smaller diameter having the opening at the top surface.

19. The sanitary hygienic valve of claim 12 wherein the valve or bonnet assembly is made of a corrosion and galling resistant material.

* * * * *